US012627036B2

(12) United States Patent
Sayama et al.

(10) Patent No.: US 12,627,036 B2
(45) Date of Patent: May 12, 2026

(54) ANTENNA DEVICE WITH ATTACHMENT MEMBER AND ATTACHMENT STRUCTURE FOR ANTENNA DEVICE

(71) Applicant: AGC Inc., Tokyo (JP)

(72) Inventors: Toshiki Sayama, Tokyo (JP); Hideaki Shoji, Tokyo (JP); Yusuke Kato, Tokyo (JP)

(73) Assignee: AGC INC., Tokyo (JP)

( * ) Notice: Subject to any disclaimer, the term of this patent is extended or adjusted under 35 U.S.C. 154(b) by 35 days.

(21) Appl. No.: 18/739,467

(22) Filed: Jun. 11, 2024

(65) Prior Publication Data

US 2024/0332811 A1 Oct. 3, 2024

Related U.S. Application Data

(63) Continuation of application No. PCT/JP2022/045566, filed on Dec. 9, 2022.

(30) Foreign Application Priority Data

Dec. 14, 2021 (JP) ................................ 2021-202862

(51) Int. Cl.
*H01Q 1/32* (2006.01)
*H01Q 1/12* (2006.01)
(Continued)

(52) U.S. Cl.
CPC ......... *H01Q 1/3291* (2013.01); *H01Q 1/1221* (2013.01); *H01Q 9/0407* (2013.01); *H01Q 13/10* (2013.01)

(58) Field of Classification Search
CPC ...... H01Q 1/12; H01Q 1/1207; H01Q 1/1221; H01Q 1/1271; H01Q 1/32; H01Q 1/325;
(Continued)

(56) References Cited

U.S. PATENT DOCUMENTS

2019/0356036 A1 11/2019 Hayakawa et al.
2020/0127381 A1 4/2020 Sone
(Continued)

FOREIGN PATENT DOCUMENTS

JP H10-53071 A 2/1998
JP 2001-203520 A 7/2001
(Continued)

OTHER PUBLICATIONS

International Searching Authority, "International Search Report," issued in connection with International Patent Application No. PCT/JP2022/045566, dated Feb. 14, 2023.
(Continued)

*Primary Examiner* — Robert Karacsony
(74) *Attorney, Agent, or Firm* — Foley & Lardner LLP

(57) ABSTRACT

An antenna device with an attachment member includes an antenna including a radiation plate provided with radiation face that radiates vertically polarized waves, a housing portion that houses the antenna, an attachment member that attaches the housing portion to a vehicle, and a metal fixing portion that is formed in an elongated shape to one end of the attachment member, that abuts a back face of the housing portion facing toward an opposite side to the radiation face, and that fixes the housing portion. Viewed from a thickness direction of the radiation plate, the fixing portion is disposed between a first region formed to the back face on one side in the extension direction of a first straight line, and a second region formed to the back face on another side in the extension direction of the first straight line.

20 Claims, 13 Drawing Sheets

(51) Int. Cl.
*H01Q 9/04* (2006.01)
*H01Q 13/10* (2006.01)

(58) Field of Classification Search
CPC .. H01Q 1/3266; H01Q 1/3275; H01Q 1/3291; H01Q 9/0407; H01Q 13/10
See application file for complete search history.

(56) References Cited

U.S. PATENT DOCUMENTS

| | | | | |
|---|---|---|---|---|
| 2020/0295444 | A1 | 9/2020 | Sampo | |
| 2021/0036412 | A1 | 2/2021 | Kodama et al. | |
| 2021/0091480 | A1 | 3/2021 | Sampo | |
| 2022/0037772 | A1 | 2/2022 | Kodama et al. | |
| 2023/0291107 | A1 * | 9/2023 | Hara | H01Q 9/0407 |
| 2023/0411865 | A1 | 12/2023 | Sampo | |

FOREIGN PATENT DOCUMENTS

| | | | | |
|---|---|---|---|---|
| JP | 2003-008317 | A | 1/2003 | |
| JP | 2019-068124 | A | 4/2019 | |
| JP | 2019-075644 | A | 5/2019 | |
| WO | WO-2018/147258 | A1 | 8/2018 | |
| WO | WO-2019/163521 | A1 | 8/2019 | |
| WO | WO-2019/208453 | A1 | 10/2019 | |
| WO | WO-2021107187 | A1 * | 6/2021 | H01Q 21/08 |

OTHER PUBLICATIONS

International Searching Authority, "Written Opinion," issued in connection with International Patent Application No. PCT/JP2022/045566, dated Feb. 14, 2023.

* cited by examiner

ANTENNA DEVICE WITH ATTACHMENT MEMBER AND ATTACHMENT STRUCTURE FOR ANTENNA DEVICE

CROSS-REFERENCE TO RELATED APPLICATIONS

This application is a continuation application of International Application No. PCT/JP2022/045566 filed Dec. 9, 2022 the disclosure of which is incorporated herein by reference in its entirety. Further, this application claims priorities from Japanese Patent Application No. 2021-202862 filed Dec. 14, 2021, the disclosure of which is incorporated herein by reference in their entirety.

TECHNICAL FIELD

The present invention relates to an antenna device with an attachment member and to an attachment structure for an antenna device.

RELATED ART

In accordance with recently improved levels of self-driving, there is a tendency to install vehicles with a communication system to implement Vehicle to Everything (V2X), such as vehicle-to-vehicle communication and road-side-to-vehicle communication and, for example, progress is being made to enable the acquisition of various safety related information from outside the vehicle utilizing the transceiving of narrow-band wavelength radio waves in a 5.9 GHz band.

In such a vehicle communication system there is, in particular, a demand for V2X antennas capable of transceiving vertically polarized radio waves of a frequency band satisfying a V2X communication standard (a 5.8 GHz band (Japan) or a 5.9 GHz band (Europe/USA) at a desired gain. Moreover, in a V2X antenna installed in a vehicle, there is a demand for stable directionality capable of implementing a desired antenna gain over a range of ±90° (180°) in a horizontal plane, left and right of a center of a vehicle forward direction (vehicle progression direction).

Japanese Patent Application Laid-Open (JP-A) No. 2019-75644 discloses an antenna for use in V2X communication disposed inside a vehicle cabin such that a radiation face of a radiation element faces toward a front glass or toward a rear glass.

However, preferably a metal bracket is employed for stably fixing to a vehicle from a vehicle cabin inside such that a radiation face of a V2X antenna faces toward a windshield or rear glass. However, when a linearly polarized wave antenna such as a V2X antenna is fixed using such a metal bracket, the transceiving properties (gain) of radio waves are changed by the metal, reducing the antenna gain, and giving rise to a concern that desired directionality might no longer be obtained.

SUMMARY

In consideration of the above circumstances, an object of the present invention is to obtain an antenna device with an attachment member and an attachment structure for an antenna device that are capable of attaching an antenna stably to a vehicle while also enabling a drop in antenna gain to be suppressed and enabling desired directionality to be implemented.

An antenna device with an attachment member according to the present invention includes an antenna including a radiation plate provided with radiation face that radiates linearly polarized waves of a prescribed frequency band, a housing portion that houses at least a portion of the antenna, an attachment member that attaches the housing portion to a vehicle, and a metal fixing portion that is formed in an elongated shape to one end of the attachment member, that abuts a back face of the housing portion on an opposite side of the radiation plate to the radiation face side, and that fixes the housing portion. When a first straight line defined as passing through a centroid of the radiation plate in a vibration direction of the linearly polarized waves when viewed from a thickness direction of the radiation plate, and a second straight line defined as being orthogonal to the first straight line and passing through the centroid, and with the fixing portion disposed with its length direction along an extension direction of the second straight line, then viewed from the thickness direction of the radiation plate, the fixing portion is disposed between a first region formed to the back face on one side in the extension direction of the first straight line, and a second region formed to the back face on another side in the extension direction of the first straight line.

An antenna device with an attachment member according to the present invention enables an antenna to be stably attached to a vehicle while also enabling a drop in antenna gain to be suppressed and enabling desired directionality to be implemented.

DETAILED DESCRIPTION

First Exemplary Embodiment

Figure 1:
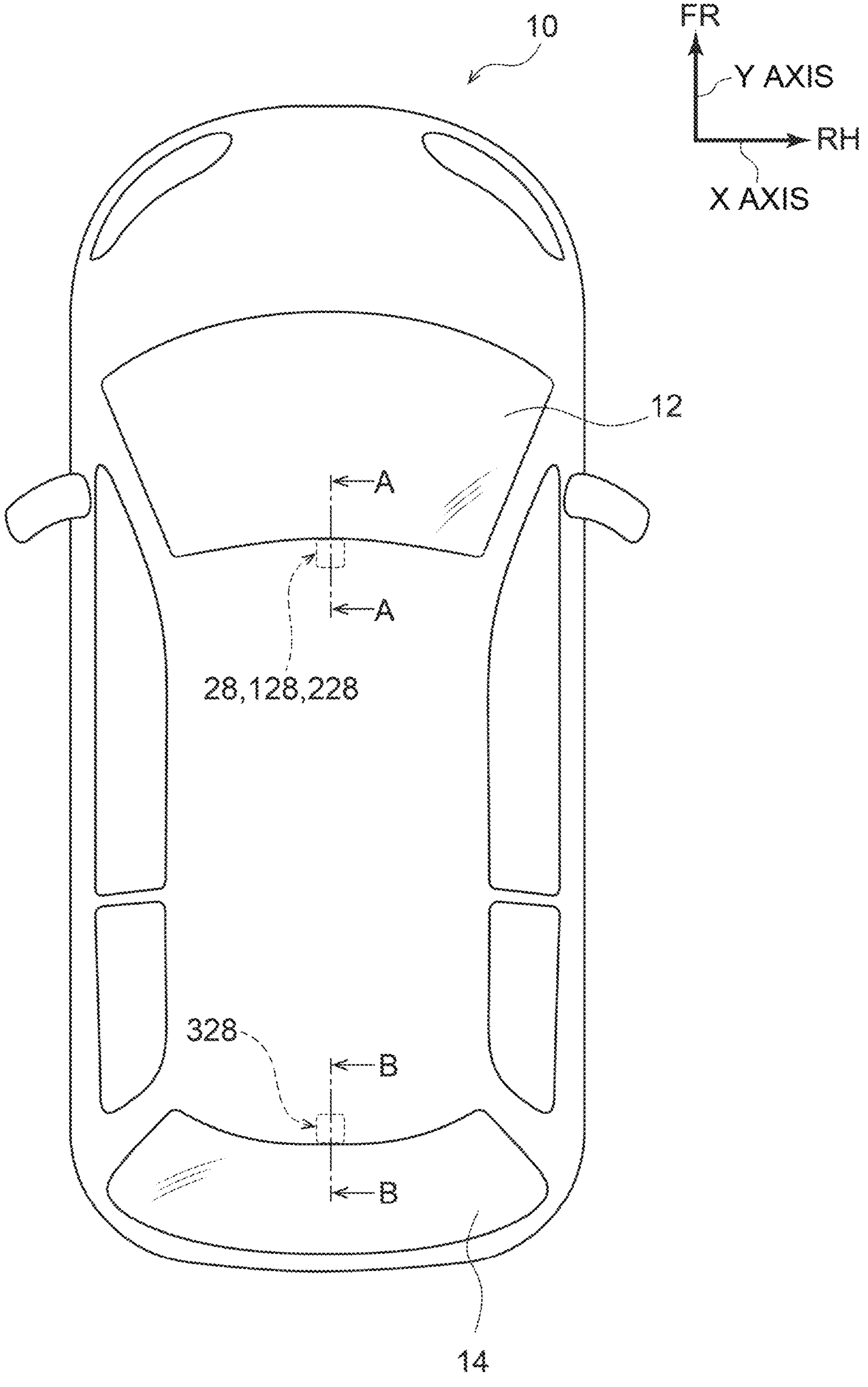
FIG. 1 is a plan view viewed from a vertical direction of a vehicle attached with an antenna device with an attachment member according to a first exemplary embodiment.

Description follows regarding an antenna device with an attachment member according to a first exemplary embodiment and an attachment structure for an antenna device thereof, with reference to the drawings. Note that, as appropriate in the drawings, an X axis is parallel to a vehicle width direction, a Y axis is parallel to a vehicle front-rear direction, and a Z axis is parallel to a vehicle up-down direction. Moreover, an arrow FR indicates forward in a vehicle front-rear direction, an arrow UP indicates upward in the vehicle up-down direction, and an arrow RH indicates right in a vehicle width direction. Moreover, an XY plane is a flat plane passing through the X axis and the Y axis, an XZ plane is a flat plane passing through the X axis and the Z axis, and the YZ plane is a flat plane passing through the Y axis and the Z axis. In the following description a vehicle 10 is positioned on a horizontal plane, the vehicle up-down direction is aligned with the vertical direction, the XY plane is aligned with a horizontal plane, and a vertical direction corresponds to a normal direction with respect to a horizontal plane. Moreover, a direction of vibration of vertically polarized waves Q is a vibration direction D. Moreover, an antenna 30 is illustrated by only a radiation plate 32, with other configuration omitted for convenience as appropriate in the drawings.

An antenna device with an attachment member 28 of the first exemplary embodiment will be described for an example attached in a vicinity of an upper (positive Z axis direction) portion of a windshield 12 of the vehicle 10.

Figure 2:
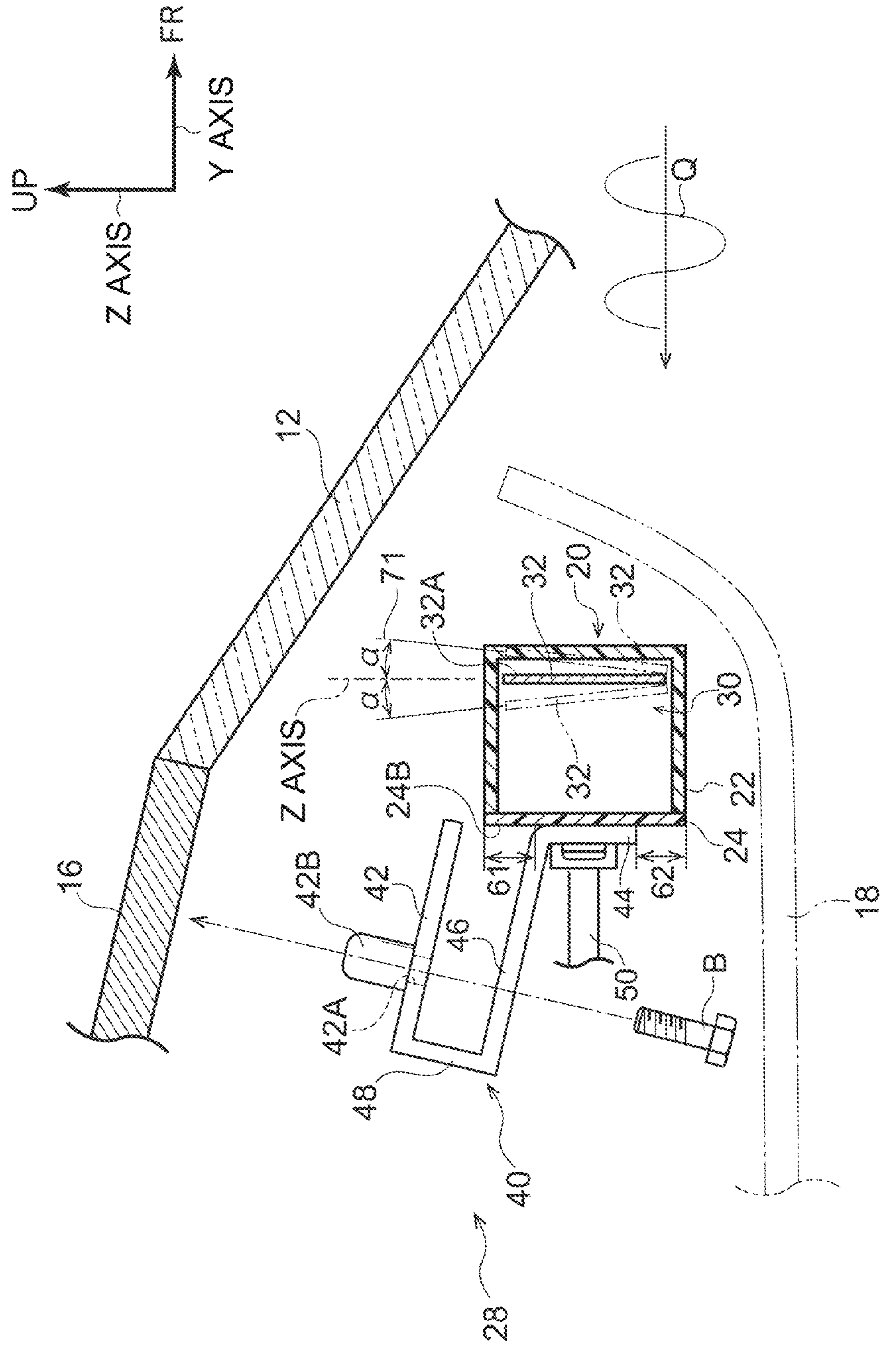
FIG. 2 is an exploded cross-section illustrating an antenna device with an attachment member according to the first exemplary embodiment in a state attached to a windshield, and illustrates a section along A-A of FIG. 1.

FIG. 1 is a plan view viewed from the vertical direction of a vehicle to which the antenna device with the attachment member 28 has been attached. As illustrated in FIG. 1, the vehicle 10 includes the windshield 12, and a rear glass 14, each serving as a sheet of glass. As illustrated in FIG. 2, the windshield 12 is attached to a metal frame 16 (for example, a metal flange) of a vehicle body by, for example, an adhesive such as a urethane resin or the like. Note that in the vehicle 10 of FIG. 1, the antenna device with the attachment member 28 (128, 228) is provided at a vehicle width direction center, however attachment may be made in the vicinity of an upper portion of the windshield 12 as a position displaced in the vehicle width direction (X axis direction) from the center in the vehicle width direction. Similarly, in the vehicle 10 of FIG. 1, for an antenna device with an attachment member 328, described later, attachment may be made in the vicinity of an upper portion of the rear glass 14 at a position displaced from the center in the vehicle width direction (X axis direction). Note that the antenna device with the attachment member 28 of the present exemplary embodiment (the antenna devices with the attachment member 128, 228, described later) may be attached as the antenna device with the attachment member 328. Namely, the antenna device with the attachment member 28 may be attached to at least one out of a vicinity of an upper portion of the windshield 12 or a vicinity of an upper portion of the rear glass 14. In the following, unless explicitly stated otherwise, the antenna device with the attachment member 28 will be described for a case attached in the vicinity of an upper portion of the windshield 12.

Antenna Device With Attachment Member Configuration

Figure 3:
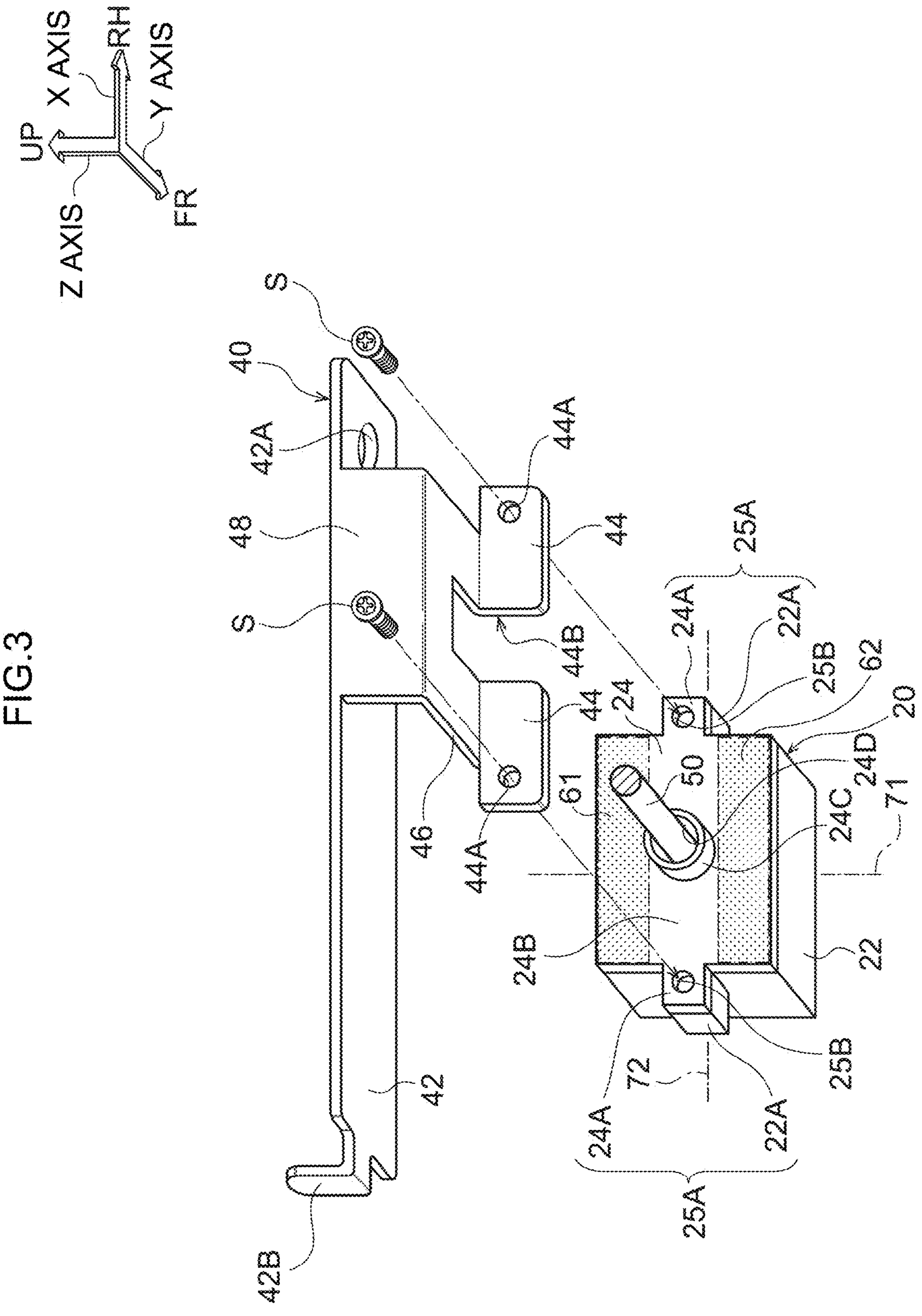
FIG. 3 is an exploded perspective view illustrating an antenna device with an attachment member according to the first exemplary embodiment looking diagonally from the rear.

FIG. 2 is an exploded cross-section at A-A of FIG. 1 including the antenna device with the attachment member 28, and FIG. 3 is an exploded perspective view of the antenna device with the attachment member 28 looking diagonally from the rear. As illustrated in FIG. 2 and FIG. 3, the antenna device with the attachment member 28 includes the antenna 30, a housing portion 20 that houses the antenna 30, and an attachment member 40 for attaching the housing portion 20 to the metal frame 16 of the vehicle 10, and is attached to a vehicle body such as the metal frame 16 by a bolt B serving as a fastening member. Note that the attachment member 40 may be attached to the metal frame 16 by a weld bolt welded to the metal frame 16 and a nut.

Antenna 30

Figure 4:
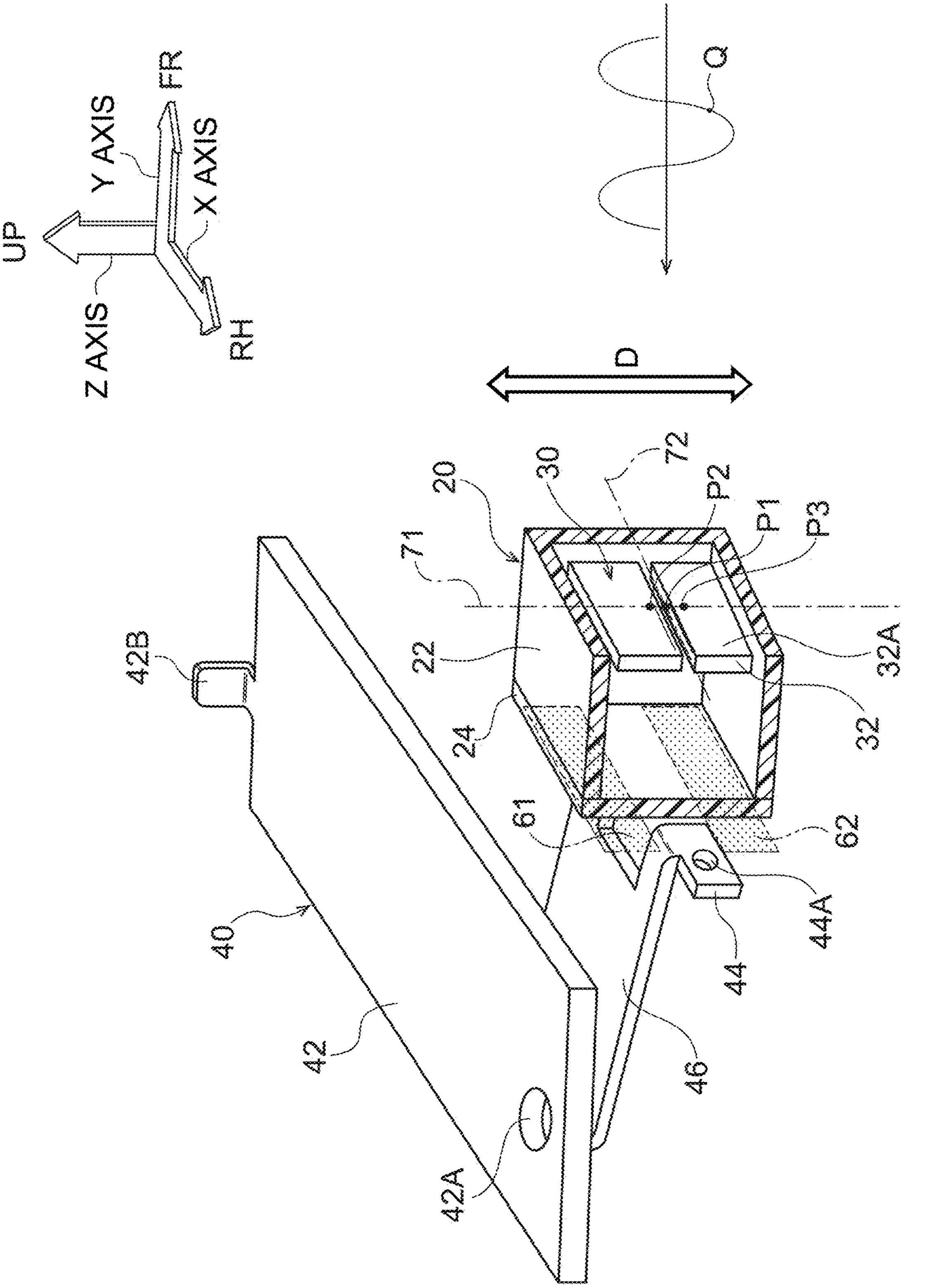
FIG. 4 is a perspective view of an antenna device with an attachment member according to the first exemplary embodiment.
Figure 5:
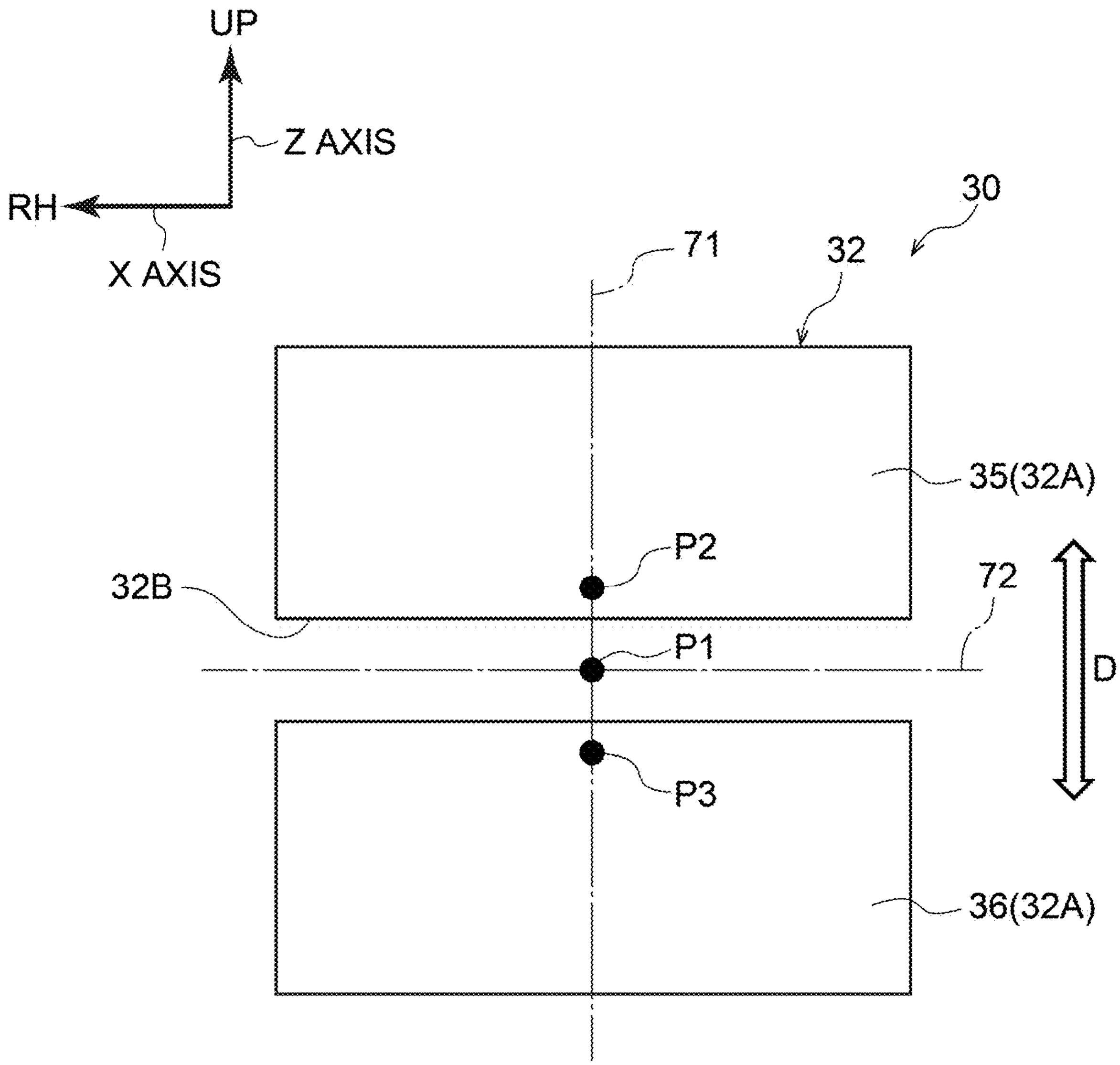
FIG. 5 is a plan view illustrating an antenna according to the first exemplary embodiment viewed from a thickness direction of a radiation plate.

FIG. 4 is a perspective view illustrating the antenna device with the attachment member 28, and FIG. 5 is a plan view of the antenna 30 looking viewed from a thickness direction of the radiation plate 32. As illustrated in FIG. 4 and FIG. 5, the antenna 30 can, for example, be applied as a V2X antenna for transceiving vertically polarized waves Q (an example of linearly polarized waves) in a 5.8 GHz band or a 5.9 GHz band used in vehicle-to-vehicle communication, roadside-to-vehicle communication, and the like. Note that the antenna device with the attachment member 28 of FIG. 4 is, for simplicity, illustrated with a coaxial cable 50 omitted however, for example, as illustrated in FIG. 3, the coaxial cable 50 extends along the plus Y axis direction, with an end portion thereof disposed inside the housing portion 20. The antenna 30 of the example of FIG. 4 and FIG. 5 is a slot antenna applicable to a V2X antenna.

As illustrated in FIG. 4 and FIG. 5, the antenna 30 includes the radiation plate (radiation conductor) 32. A radiation face 32A is configured by a surface on a vehicle front-rear direction front side of the radiation plate 32. The radiation face 32A radiates, for example, vertically polarized waves Q in a 5.8 GHz band or a 5.9 GHz band employed for V2X.

The radiation plate 32 includes a slot 32B formed as an opening dividing at least at a portion of the radiation face 32A into a surface portion 35 and a surface portion 36. The slot 32B extends along an extension direction of a second straight line 72. The surface portion 35 is a conductive location positioned on the Z axis direction positive side of the slot 32B. The surface portion 36 is a conductive location positioned on the Z axis direction negative side of the slot 32B. The surface portion 35 includes a feed point P2 and the surface portion 36 includes a feed point P3. Note that although the slot 32B of the antenna 30 illustrated in FIG. 5 extends parallel to the second straight line 72, the slot 32B of the antenna 30 may be an opening parallel to the second straight line 72 and not overlapping with the second straight line 72, and may be an opening so as to extend in a direction inclined with respect to the second straight line 72 so as to form an angle that is an acute angle exceeding 0° with respect thereto.

The pair of feed points P2, P3 are places where the coaxial cable 50 is electrically connected. The feed point P2 is electrically connected to a grounded portion of the coaxial cable 50. The feed point P3 is electrically connected to a signal line of the coaxial cable 50. Note that the feed point P2 may be electrically connected to the signal line of the coaxial cable 50, and in such cases the feed point P3 is electrically connected to the grounded portion of the coaxial cable 50.

Figure 6:
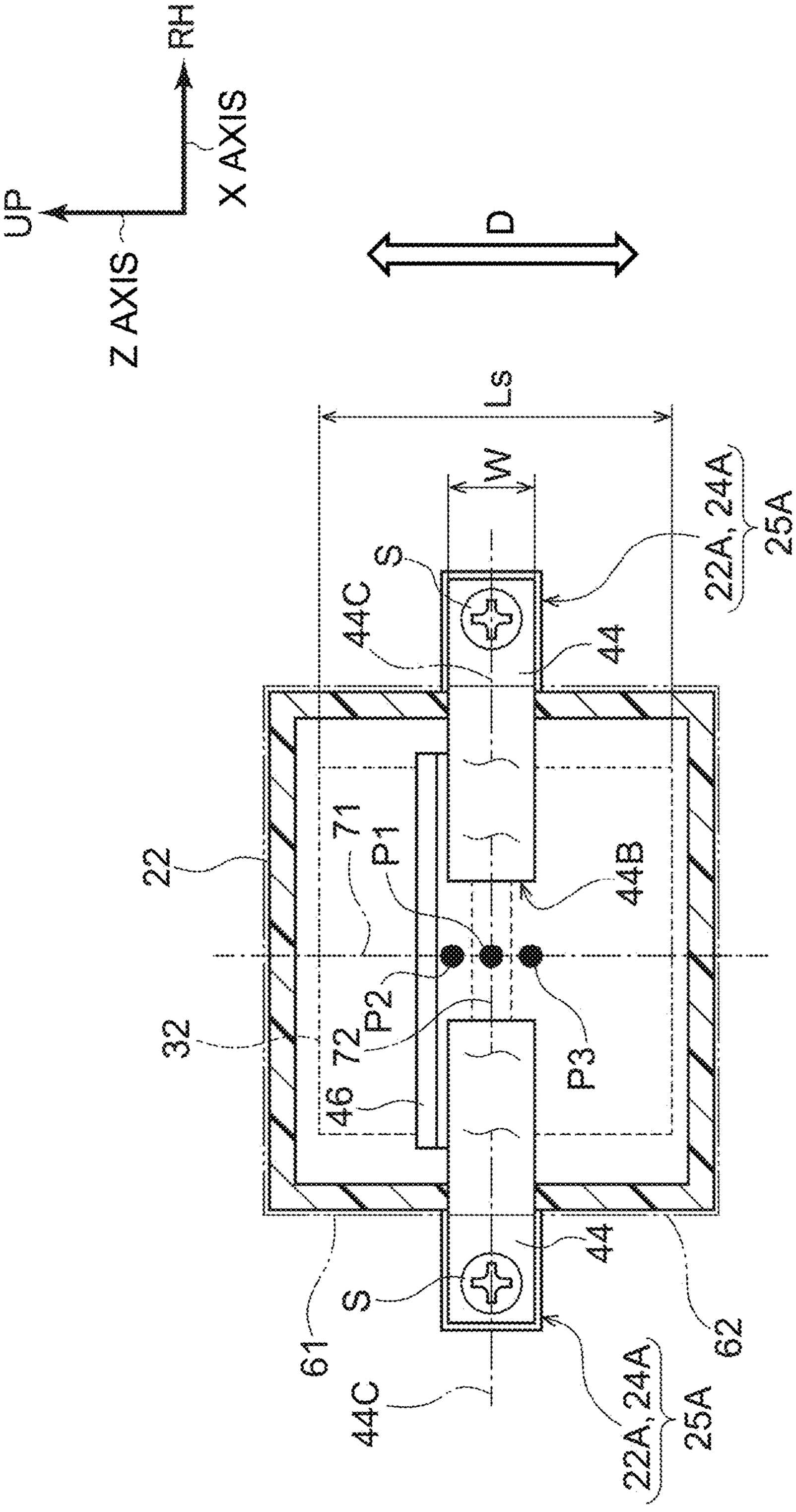
FIG. 6 is a plan view illustrating an antenna device with an attachment member according to the first exemplary embodiment viewed from a thickness direction of a radiation plate.

FIG. 6 is a plan view of the antenna device with the attachment member 28, viewed from the thickness direction of the radiation plate 32 from the opposite side to the radiation face 32A side. As illustrated in FIG. 5 and FIG. 6, viewed from the thickness direction of the radiation plate 32, a first straight line 71 is defined as being a straight line passing through a centroid P1 of the radiation plate 32 as the vibration direction D of the vertically polarized waves Q. Moreover, the second straight line 72 is defined as being a straight line orthogonal to the first straight line 71 and passing through the centroid P1 of the radiation plate 32.

Viewed from the thickness direction of the radiation plate 32, the feed point P2 and the feed point P3 of the antenna 30 are disposed on the first straight line 71 at positions different from the centroid P1 of the radiation plate 32. Namely, viewed from the thickness direction of the radiation plate 32, the first straight line 71 may be a straight line passing through the centroid P1 of the radiation plate 32, and the feed point P2 or the feed point P3. Moreover, as illustrated in FIG. 5, the first straight line 71 may be a straight line extending in a direction orthogonal to the length direction of the slot 32B. Note that the slot 32B may be disposed so as to extend in the vehicle width direction (X axis direction) displaced in the Z axis direction from the second straight line, and in such cases one or other out of the feed point P2 or the feed point P3 may be aligned with the centroid P1. Note that in such cases the centroid P1, and the feed point P2 and the feed point P3, are disposed on the first straight line 71.

Housing Portion 20

As illustrated in FIG. 2 and FIG. 4, the housing portion 20 is, for example, made from resin, and formed in a box shape by a case section 22 and a cover section 24.

Case Section 22

As illustrated in FIG. 3 and FIG. 4, the case section 22 is, for example, formed in a box shape having an open face at a vehicle front-rear direction rear side, with the antenna 30 housed inside the case section 22. A protrusion 22A protruding toward the outside in the vehicle width direction may be formed to side faces on both vehicle width direction sides of the case section 22. As illustrated in FIG. 6, the protrusions 22A protrude along the second straight line 72 viewed from the thickness direction of the radiation plate 32. Note that the case section 22 may also be formed in a box shape having an open face at a vehicle front side, and is also not limited to being a configuration so as to entirely cover the antenna 30, and may include a portion that is not covered.

Cover Section 24

As illustrated in FIG. 3 and FIG. 4, the cover section 24 is formed in a plate shape so as to cover the opening of the case section 22, and is attached to the case section 22 at a position on the opposite side of the antenna 30 to the radiation face 32A side of the radiation plate 32. A protrusion 24A protruding toward the vehicle width direction outside is formed to both vehicle width direction side faces of the cover section 24. As illustrated in FIG. 6, the protrusions 24A protrude along the second straight line 72 viewed from the thickness direction of the radiation plate 32. The protrusions 22A and the protrusions 24A configure protruding portions 25A of the housing portion 20.

As illustrated in FIG. 3, an attachment hole 25B is formed to the protruding portions 25A as attachment portions to attach fixing portions 44 to the housing portion 20. The fixing portions 44 are attached to the housing portion 20 by screws S, serving as metal fastening members, being attached to the attachment holes 25B such that the cover section 24 and the fixing portions 44 are fastened together. Note that attachment of the fixing portions 44 and the housing portion 20 is not limited to fixing by the screws S, and various fixing structures may be adopted as long as mechanical fixing is achieved.

In the cover section 24, a circular cylindrical shaped boss 24C may be formed so as to extend toward a vehicle rear direction at a back face 24B on a rear side in the vehicle front-rear direction. An opening hole 24D at the inside of the boss 24C is formed so as to pierce through the cover section 24. One end of the coaxial cable 50 serving as a feed line is inserted into the opening hole 24D, and is electrically connected to the feed point P2 and the feed point P3. The other end of the coaxial cable 50 is connected to a control device for controlling signals transceived with the antenna 30. Note that an opening hole provided in the back face 24B of the cover section 24 may have any freely selected shape, and the presence or absence of a boss 24C is also optional. The feed line is not limited to being a coaxial cable, and various transmission lines employed for radio signal communication may be used therefor, such as a strip line, a microstrip line, a coplanar waveguide, a grounded coplanar waveguide (GCPW), a coplanar strip, a slot line, a waveguide, and the like.

Attachment Member 40

As illustrated in FIG. 2, the attachment member 40 couples the housing portion 20 and the metal frame 16 of the vehicle 10 together. The attachment member 40 is formed from metal, and is configured including an attachment portion 42, fixing portions 44, an extension portion 46, and a connection portion 48. The attachment member 40 may be formed by mechanically linking plural types of metal together, and may be formed with welding processing. Furthermore, the attachment member 40 may partly contain a resin in cases in which plural materials including metal are linked together. However, from the perspective of obtaining a high rigidity, the attachment member 40 is preferably integrally formed from metal. In the following, unless explicitly stated otherwise, the attachment member 40 is integrally formed from metal.

Attachment Portion 42

As illustrated in FIG. 2, the attachment portion 42 is formed at one end of the attachment member 40. As illustrated in FIG. 3 and FIG. 4, the attachment portion 42 is formed in an elongated rectangular plate shape extending along the vehicle width direction. The attachment portion 42 may be provided with a through hole 42A piercing through in the plate thickness direction, and an extension portion 42B that extends in a substantially vehicle upward direction from a vicinity of a side face of the attachment portion 42.

The through hole 42A is formed further to the vehicle width direction right side than the extension portion 46. As illustrated in FIG. 2, the attachment member 40 is attached to the metal frame 16 of the vehicle 10 by the bolt B, serving as a fastening member and inserted into the through hole 42A. Note that the through hole 42A may be formed further to the vehicle width direction left side than the extension portion 46, and may be formed at both vehicle width direction sides thereof.

The extension portion 42B facilitates positioning of the attachment member 40 with respect to the vehicle body by abutting an non-illustrated protrusion of the metal frame 16.

Fixing Portions 44

As illustrated in FIG. 2, the fixing portions 44 are formed at the other end of the attachment member 40. In the cross-section illustrated in FIG. 2, the fixing portions 44 are formed so as to extend in the vertical direction (Z axis direction). FIG. 2 illustrates an example in which the cross-section of the case section 22 is a rectangular shape, and the fixing portions 44 are substantially parallel to the radiation face 32A of the radiation plate 32 in cross-section of the case section 22. Note that, instead of being a cuboidal body, the case section 22 may be shaped so as not to be parallel to the fixing portions 44 and the radiation face 32A in cross-section, and in such cases too, it is sufficient that the radiation face 32A is within a range of ±15° with respect to the vertical direction, as described later. Moreover, as illustrated in FIG. 3 and FIG. 4, although the fixing portions 44 are formed in an elongated shape, and in particular an elongated rectangular shape, extending along the vehicle width direction, the shape thereof may be a freely selected design. Note that the length direction of the fixing portions 44 may be disposed along the extension direction of the second straight line 72.

Moreover, through holes 44A are formed in the vicinity of both length direction end portions of the fixing portions 44 so as to pierce through in the plate thickness direction. One of the through holes 44A is formed at a position corresponding to one of the attachment holes 25B, and another of the through holes 44A is formed at a position corresponding to the other of the attachment holes 25B.

The screws S are attached to the attachment holes 25B in a state in which the fixing portions 44 abut the back face 24B of the housing portion 20 on the opposite side of the radiation plate 32 to the radiation face 32A. The cover section 24 and the fixing portions 44 are thereby fastened together, and the fixing portions 44 are attached to the housing portion 20.

As illustrated in FIG. 6, viewed from the thickness direction of the radiation plate 32, the fixing portions 44 are disposed such that the length direction axial line 44C of the fixing portions 44 overlaps with the second straight line 72. In other words, viewed from the thickness direction of the radiation plate 32, the fixing portions 44 are preferably disposed such that the length direction axial line 44C of the fixing portions 44 is aligned with the second straight line 72.

Note that viewed from the thickness direction of the radiation plate 32, the fixing portions 44 can be permitted to be slightly displaced as long as the length direction axial line 44C of the fixing portions 44 is along the second straight line 72. Namely, viewed from the thickness direction of the radiation plate 32, the fixing portions 44 may be disposed such that the length direction axial line 44C of the fixing portions 44 does not overlap with the second straight line 72. However, it is sufficient for the fixing portions 44 to be disposed so as to at least overlap with the second straight line 72, and even in cases in which the second straight line 72 and the length direction axial line 44C are not completely aligned with each other, preferably they have a parallel positional relationship to each other viewed from the thickness direction of the radiation plate 32.

Moreover, viewed from the thickness direction of the radiation plate 32, if the fixing portions 44 are formed with line symmetry to the second straight line 72, then this facilitates the antenna 30 securing desired directionality while also being able to secure desired antenna gain, as described later. Furthermore, viewed from the thickness direction of the radiation plate 32, the fixing portions 44 are more preferably formed with line symmetry to the first straight line 71.

The fixing portions 44 may each be provided with an opening portion 44B open in the plate thickness direction in a vicinity of the centroid P1 of the radiation plate 32. The opening portion 44B is preferably a through hole or cut out larger than an outer diameter of the coaxial cable 50. In such cases a structure is adopted in which the coaxial cable 50 passes through the opening portion 44B and the back face 24B and is easily connected to the antenna 30. Note that the fixing portions 44 are not necessarily provided with an opening portion 44B, and in such cases the coaxial cable 50 may, for example, be connected to the antenna 30 via a non-illustrated through hole from above the housing portion 20 (a negative direction along the Z axis direction).

As illustrated in FIG. 3, FIG. 4, and FIG. 6, viewed from the thickness direction of the radiation plate 32, the fixing portions 44 are disposed between a first region 61 formed on the back face 24B at an extension direction one-side of the first straight line 71, and a second region 62 formed on the back face 24B at an extension direction other-side of the first straight line 71. In other words, viewed from the thickness direction of the radiation plate 32, the fixing portions 44 are disposed such that the first region 61 and the second region 62 are present on the back face 24B at each of the two extension direction sides of the first straight line 71 (width direction two sides of the fixing portions 44).

Moreover, as illustrated in FIG. 6, a width W of the fixing portions 44 along the first straight line 71 is formed so as to be narrower than a width $L_S$ of the radiation plate 32 along the first straight line 71. Note that width W of the fixing portions 44 is not limited to being a constant width, and may include different widths.

The width W of the fixing portions 44 along the first straight line 71, and the width $L_S$ of the radiation plate 32 along the first straight line 71, may satisfy the following Equation (1a), preferably satisfy the following Equation (1b), and more preferably satisfy the following Equation (1c). When $W/L_S$ is less than 0.01 a concern arises that the fixing strength between the fixing portions 44 and the housing portion 20 might be weak and unstable. Moreover, when the $W/L_S$ exceeds 0.75 a concern arises that there would be a drop in the antenna gain of the antenna 30.

$$0.01 \leq W/L_S \leq 0.75 \quad \text{Equation (1a)}$$

$$0.05 \leq W/L_S \leq 0.65 \quad \text{Equation (1b)}$$

$$0.10 \leq W/L_S \leq 0.50 \quad \text{Equation (1c)}$$

Extension Portion 46

As illustrated in FIG. 2 and FIG. 4, the extension portion 46 is formed extending from a vehicle up-down direction upper end of the fixing portions 44 in a direction separating from the radiation plate 32. In particular, in cases in which the back face 24B is a plane substantially parallel to the radiation face 32A, the extension portion 46 extends in a direction separating from the radiation plate 32 so as not to contact the back face 24B. In such cases the extension portion 46 is formed extending in a vehicle rearward direction from the vehicle up-down direction upper ends of the fixing portions 44. The extension portion 46 is formed so as not to contact the first region 61 and the second region 62. Note that the extension portion 46 may be formed extending in a direction separating from the radiation plate 32 at vehicle up-down direction lower ends of the fixing portions 44, or at a freely selected position between the upper ends and the lower ends.

As illustrated in FIG. 2 and FIG. 4, in cross-section along the YZ plane, the attachment member 40 is formed in a substantially L-shape by the extension portion 46 and the fixing portions 44, however there is no limitation to being a substantially L-shape. For example, the extension portion 46 may be formed in a substantially T-shape, extending from between the vehicle up-down direction upper ends and the lower ends of the fixing portions 44. Moreover, a vehicle width direction width of the extension portion 46 is not particularly limited as long as a desired rigidity of the attachment member 40 is obtained and may, for example, be substantially the same vehicle width direction width of the radiation plate 32.

Connection Portion

As illustrated in FIG. 2 and FIG. 4, the connection portion 48 connects one end on a vehicle front-rear direction rear side of the extension portion 46 to one end on a vehicle front-rear direction rear side of the attachment portion 42. The vehicle width direction width of the connection portion 48 is not particularly limited as long as a desired rigidity of the attachment member 40 is obtained and may, for example, be substantially the same vehicle width direction width of the extension portion 46. In cross-section along the YZ plane, the attachment member 40 is formed in a substantially U-shape by the attachment portion 42, the extension portion 46, and the connection portion 48, however the attachment member 40 may be formed in a substantially J-shape.

The antenna device with the attachment member 28 configured in this manner is, as illustrated in FIG. 2, attached to the metal frame 16 such that an angle α of the radiation face 32A with respect to the vertical direction is within ±15°. In other words, the antenna device with the attachment member 28 is attached to the metal frame 16 such that the first straight line 71 is within a range of ±15° with respect to the vehicle up-down direction. The antenna device with the attachment member 28 is attached to the metal frame 16 with the radiation face 32A of the radiation plate 32 separated from the windshield 12. Note that the angle α of the radiation face 32A with respect to the vertical direction is preferably within ±10°, is more preferably within ±5°, is still more preferably within ±3°, is particularly preferably within +1°, and is most preferably 0°.

Note that the antenna device with the attachment member 28 may be attached in the vicinity of the rear glass 14. When doing so in cases in which the antenna device with the attachment member 28 is disposed in the vehicle cabin, disposing the antenna device with the attachment member 28 in an area without any conductors (conductor wires) such as defogger (heating wires) or the like formed to a main face of the rear glass 14 results in the antenna gain not being liable to drop, and so is preferable.

Directionality Analysis

Description follows regarding directionality analysis performed to confirm advantageous effects of the antenna device with the attachment member 28 of the first exemplary embodiment and the attachment structure for the antenna device 28.

Figure 7A:
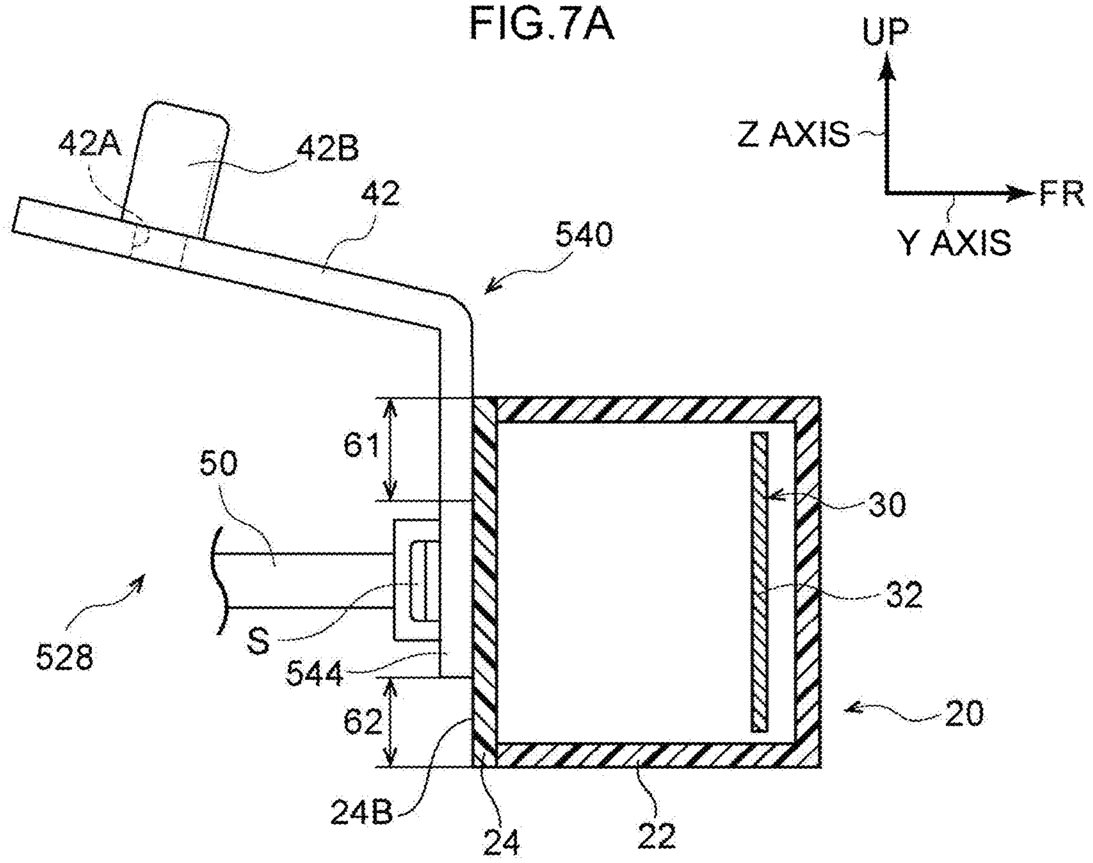
FIG. 7A is a cross-section illustrating an antenna device of a comparative example/reference example in side view, and illustrates an antenna device with an attachment member as a comparative example.
Figure 7B:
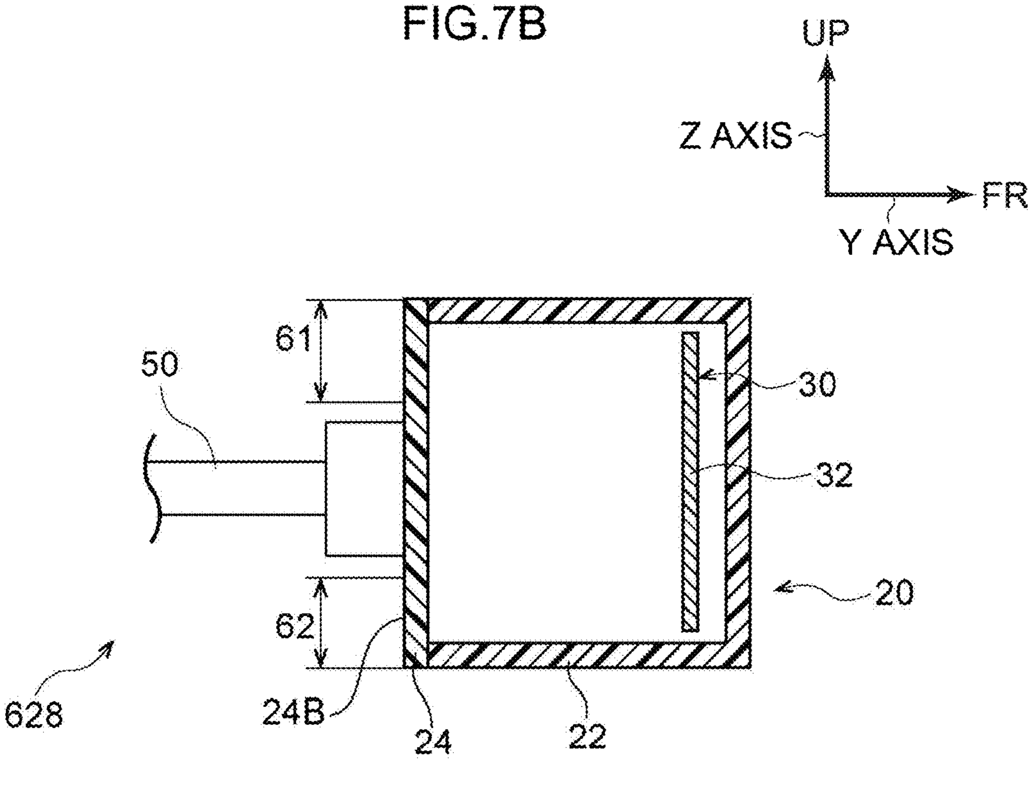
FIG. 7B is a cross-section illustrating an antenna device of a comparative example/reference example in side view, and illustrates a no attachment member antenna device as a reference example.

FIG. 7A is a cross-section of an antenna device with an attachment member of a comparative example, and FIG. 7B is a cross-section of a no attachment member antenna device serving as a reference example. In the directionality analysis, an "Example 1" antenna device with an attachment member 28 was prepared as a working example of the first exemplary embodiment, an "Example 2" antenna device with an attachment member 528 was prepared as a comparative example, and an "Example 3" no attachment member antenna device 628 was prepared as a reference example. Note that details regarding the connection between the coaxial cable 50 and the antenna 30 are omitted in FIG. 7A and FIG. 7B.

The working example "Example 1" antenna device with the attachment member 28 had a width W of the fixing portions 44 along the first straight line 71 of 10.0 mm, and had a width $L_S$ of the radiation plate 32 along the first straight line 71 of 14.8 mm. The fixing portions 44 are disposed such that the length direction axial line 44C of the fixing portions 44 is aligned with the second straight line 72. Furthermore, the extension portion 46 (illustrated in FIG. 2) is provided to the attachment member 40 so as to extend separating from the radiation plate 32 at an angle of about 90° with respect to the back face 24B.

The comparative example "Example 2" antenna device with the attachment member 528 is, as illustrated in FIG. 7A, formed such that a fixing portion 544 contacts the entire first region 61 formed to the back face 24B of the housing portion 20. An attachment member 540 is formed in a substantially L-shape in cross-section along the YZ plane by the attachment portion 42 and the fixing portion 544.

The reference example "Example 3" no attachment member antenna device 628 is a model not including a fixing portion on the back face 24B of a housing portion, as disclosed in FIG. 7B.

Directionality analysis was performed on vertically polarized waves Q of 5.9 GHz in a horizontal plane for the antenna device with the attachment member 28, for the antenna device with the attachment member 528, and for the no attachment member antenna device 628.

Figure 8:
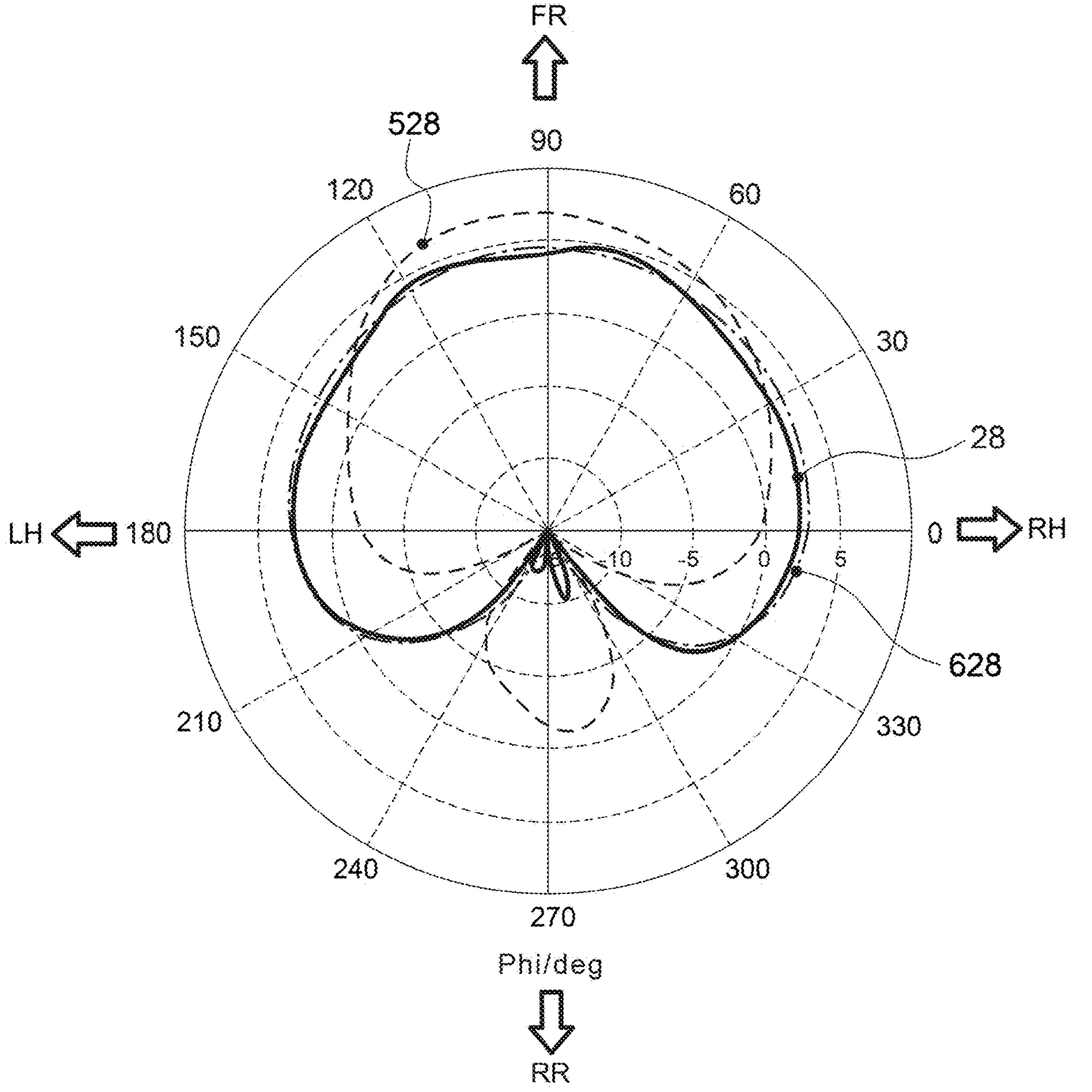
FIG. 8 is an analysis diagram illustrating an analysis result of directionality properties.

FIG. 8 is a graph illustrating directionality properties in a horizontal plane of each antenna device of "Example 1" to "Example 3", looking along the vehicle vertical direction. As illustrated by the single-dot broken line in FIG. 8, it is apparent that the reference example "Example 3" no attachment member antenna device 628 has undistorted antenna gain of substantially the same magnitude in directions of ±90° left and right centered on the vehicle progression direction, namely excellent directionality is obtained over a prescribed angle range of a horizontal plane.

As illustrated by the solid line in FIG. 8, it is apparent that the working example "Example 1" antenna device with the attachment member 28 also has undistorted antenna gain of substantially the same magnitude in directions of ±90° left and right centered on the vehicle progression direction, namely excellent directionality is obtained in a prescribed angle range of a horizontal plane. Thus the working example antenna device with the attachment member 28 has substantially the same antenna gain, and obtains substantially the same directionality, as the reference example no attachment member antenna device 628.

However, as illustrated by the dashed line in FIG. 8, the comparative example "Example 2" antenna device with the attachment member 528 had a drop in antenna gain on the vehicle right hand side (RH) and vehicle left hand side (LH) compared to "Example 1", with disorder arising in the directionality. This means that the working example "Example 1" antenna device with the attachment member 28 has a desired antenna gain across a prescribed angle range (from the LH side to the FR side to the RH side) and also obtains excellent directionality.

First Exemplary Embodiment Operation

Next, description follows regarding operation and advantageous effects of the antenna device with the attachment member 28 of the first exemplary embodiment and the attachment structure for the antenna device 28.

The housing portion 20 is strongly fixed to the attachment member 40 due to making the fixing portions 44 from metal, and in particular due to making an integrated metal attachment member 40. This means that the antenna device with the attachment member (antenna 30) can be stably attached to the vehicle 10.

Moreover, the antenna device with the attachment member 28 is disposed such that the fixing portions 44 are between the first region 61 and the second region 62, and the first region 61 and the second region 62 are formed to the back face 24B of the housing portion 20 on both sides of the fixing portions 44 in the extension direction of the first straight line 71, where the metal fixing portions 44 is not disposed. Namely, the antenna device with the attachment member 28 transceives the vertically polarized waves Q, and the metal fixing portions 44 are not formed at an open end where an electric field is strong when a current has flowed in the vibration direction D of the vertically polarized waves Q in the antenna 30. This means that changes to the transceiving properties of the vertically polarized waves Q due to the metal fixing portions 44 are suppressed in the antenna device with the attachment member 28, a drop in antenna gain can be suppressed even with the antenna 30 stably attached to the vehicle 10, and as a consequence a desired antenna directionality can be secured.

In the antenna device with the attachment member 28, the fixing portions 44 are disposed such that the length direction axial line 44C of the fixing portions 44 overlaps with the second straight line 72. This means that in the extension direction of the first straight line 71, the first region 61 and the second region 62 where the metal fixing portions 44 are not disposed are substantially the same size as each other. Furthermore, a region where the first region 61 overlaps with the radiation plate 32 that is a conductor of the antenna 30, and a region where the second region 62 overlaps with the radiation plate 32 that is a conductor of the antenna 30, have substantially the same shape and substantially the same surface area as each other. This means that changes to the transceiving properties of the vertically polarized waves Q due to the metal fixing portions 44 are further suppressed in the antenna device with the attachment member 28, enabling a drop in antenna gain to be further suppressed, and consequently enabling a desired antenna directionality to be secured.

The fixing portions 44 and the radiation plate 32 are configured with a width W of the fixing portions 44 (the first straight line 71) set such that the above Equation (1a) is satisfied. By doing so the antenna device with the attachment member 28 is able to suppress a drop in antenna gain while still securing rigidity, and is consequently able to secure stable directionality.

The fixing portions 44 and the housing portion 20 are attached using the metal screws S at positions where the metal screws S are separated from the radiation plate 32 by forming the attachment holes 25B for attaching the fixing portions 44 to the housing portion 20 in the protruding portions 25A. This means that in the antenna device with the attachment member 28 changes to the transceiving properties of the vertically polarized waves Q due to the metal screws S are suppressed, enabling a drop in antenna gain to be suppressed, and consequently enabling a stable directionality to be secured.

In the antenna device with the attachment member 28, the fixing portions 44 have line symmetry with respect to the second straight line 72, and so the first region 61 and the second region 62 where the fixing portions 44 are not disposed, which are at the two width direction sides of the metal fixing portions 44, are substantially the same size as each other. This means that the antenna device with the attachment member 28 is able to suppress changes to the transceiving properties of the vertically polarized waves Q due to the metal fixing portions 44, is able to suppress a drop in antenna gain, and consequently is able to secure stable directionality.

By forming the opening portion 44B in the fixing portions 44, the fixing portions 44 include a space to electrically connect the coaxial cable 50 to the feed point P2 and the feed point P3. This facilitates connection of the coaxial cable 50 to a prescribed position. Note that the antenna device with the attachment member 28 may furthermore include a non-illustrated connector for fixing the coaxial cable 50 and connecting the coaxial cable 50 to the feed point P2 and the feed point P3.

In the antenna device with the attachment member 28, the attachment member 40 is formed from metal, and so the housing portion 20 is strongly fixed to the vehicle 10 by the attachment member 40. This means that the antenna 30 is stably attached to the vehicle 10.

Moreover, the antenna device with the attachment member 28 obtains high rigidity due to the attachment member 40 being integrally formed from metal, and so the antenna 30 is stably attached at a desired position and orientation.

In the antenna device with the attachment member 28, the antenna 30 is attached to the vehicle 10 through the metal extension portion 46, and so the antenna 30 can be strongly fixed to the vehicle 10. Moreover, the extension portion 46 extends in a direction separating from the radiation plate 32, and so changes to transceiving properties of the vertically polarized waves Q due to the metal extension portion 46 are suppressed in the antenna device with the attachment member 28, enabling a drop in antenna gain to be suppressed, and consequently enabling a stable directionality to be secured.

Moreover, in the antenna device with the attachment member 28, the radiation face 32A is provided so as to be within ±15° with respect to the vertical direction, and so the radiation face 32A faces in a substantially horizontal direction. This thereby enables the radiation face 32A to transceive the vertically polarized waves Q propagating in a substantially horizontal direction.

Second Exemplary Embodiment

An antenna device with an attachment member of a second exemplary embodiment and an attachment structure for an antenna device thereof differ from the first exemplary embodiment in the point that the configuration of the attachment member is different. Note that the same terminology or reference numerals are employed to describe the same or equivalent portions to the content described for the first exemplary embodiment, and description is omitted for configuration and operation and advantageous effects similar to those of the above exemplary embodiment.

Attachment Member

Figure 9:
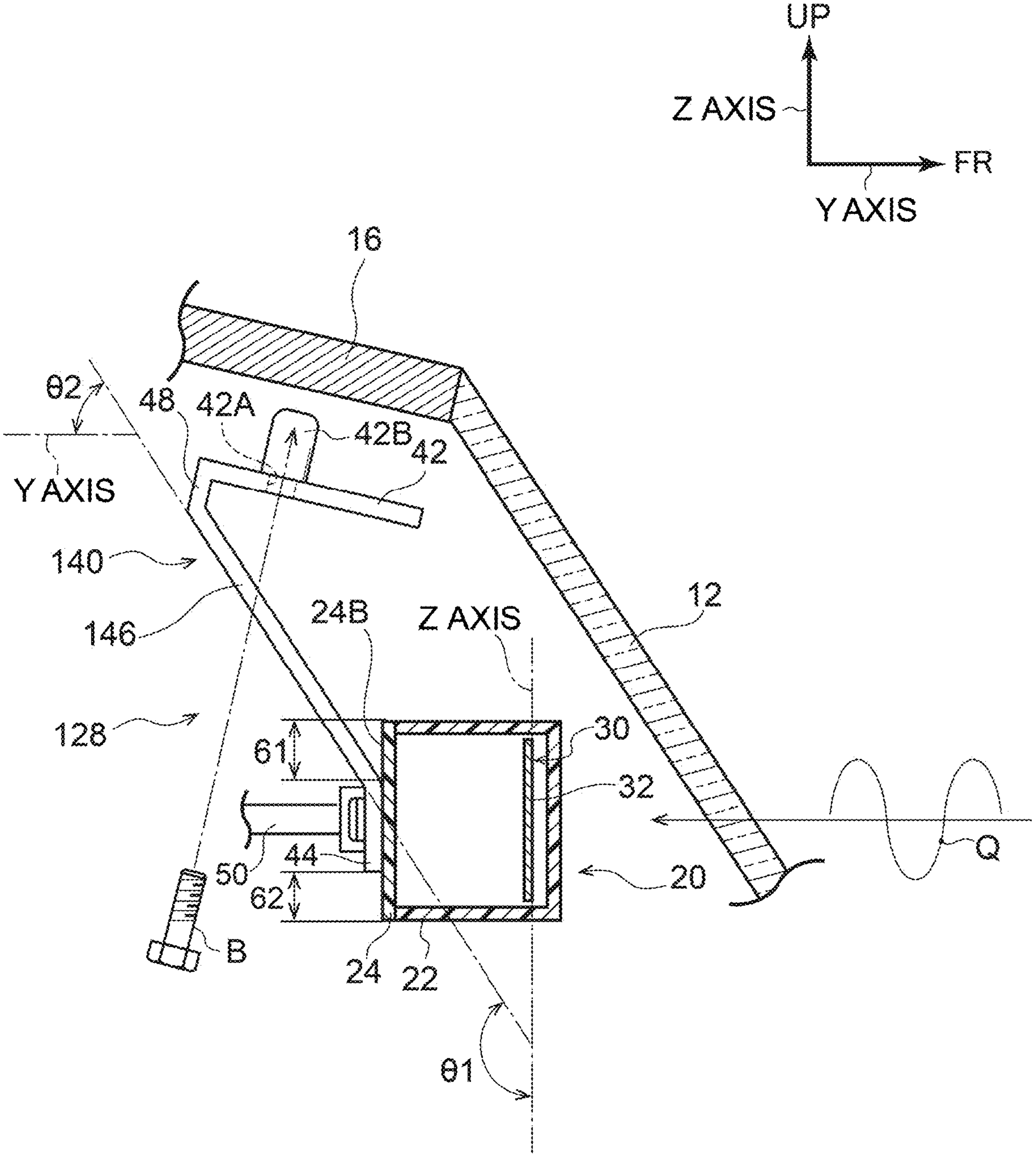
FIG. 9 is an exploded cross-section illustrating an antenna device with an attachment member according to a second exemplary embodiment in a state attached to a windshield, and illustrates a section along A-A of FIG. 1.

FIG. 9 is an exploded cross-section including an antenna device with an attachment member 128, taken along A-A of FIG. 1. As illustrated in FIG. 9, the antenna device with the attachment member 128 includes an attachment member 140 integrally formed from metal, and the attachment member 140 includes an attachment portion 42, fixing portions 44, an extension portion 146, and a connection portion 48.

The extension portion 146 is formed so as not to contact the back face 24B, and so as to extend from vehicle up-down direction upper ends of the fixing portions 44 in a direction separating from the radiation plate 32. Note that the extension portion 146 may be formed so as to extend in a direction separating from the radiation plate 32 from vehicle up-down direction lower ends of the fixing portions 44, or from between the vehicle up-down direction upper ends and lower ends of the fixing portions 44. The extension portion 146 is formed so as to extend from the vehicle up-down direction upper ends of the fixing portions 44 in a diagonally upward and rearward direction of the vehicle 10. The extension portion 146 is formed so as not to contact the first region 61 and the second region 62.

An attachment angle of the windshield 12 is, for example 23° with respect to the horizontal plane (XY plane) in a sedan type vehicle, and is, for example 50° with respect to the horizontal plane in a wagon type light motor vehicle. Moreover, an attachment angle of the rear glass 14 is, for example 18° with respect to the horizontal plane in a sedan type vehicle, and is, for example 45° with respect to the horizontal plane in a hatchback type vehicle.

The antenna device with the attachment member 128 is able to adjust an angle θ1 formed between the extension portion 146 and the radiation face 32A in a range of 20° to 160° according to the attachment angles of the windshield 12 and the rear glass 14. Note that the angle θ1 may also be called the angle formed between the extension portion 146 and the fixing portions 44 when, as in the cross-section illustrated in FIG. 9, the angle θ1 is for a case in which the case section 22 is substantially rectangular and the radiation face 32A and the fixing portions 44 are substantially parallel along the vertical direction. Moreover, in a state in which the attachment member 140 is attached to the metal frame 16, the antenna device with the attachment member 128 is able to adjust an angle θ2 of a direction of extension of the extension portion 146 with respect to the horizontal plane in a range of, for example, from −30° to 70°.

Second Exemplary Embodiment Operation

Next, description follows regarding operation and advantageous effects of the antenna device with the attachment member 128 of the second exemplary embodiment and the attachment structure for the antenna device 128 thereof.

In the antenna device with the attachment member 128, as long as the angle θ1 formed between the extension portion 146 and the radiation face 32A is in a range of from 20° to 160°, then the metal extension portion 146 is disposed separated from the first region 61 and the second region 62. This means that changes to the transceiving properties of the vertically polarized waves Q due to the metal extension portion 146 are suppressed in the antenna device with the attachment member 128, a drop in antenna gain can be suppressed, and consequently stable directionality can be secured. Note that 01 may be in a range of from 90° to 135°, and may be in a range of from 45° to 90°.

Moreover, in the antenna device with the attachment member 128, as long as the extension direction of the extension portion 146 is in a range of from −30° to 70 with respect to the horizontal plane, the metal extension portion 146 is disposed separated from the first region 61 and the second region 62. This means that changes to the transceiving properties of the vertically polarized waves Q due to the metal extension portion 146 are suppressed in the antenna device with the attachment member 128, a drop in antenna gain can be suppressed, and consequently stable directionality can be secured. Note that 02 may be in a range of from 0° to 45°, and may be in a range of from −30° to 0°.

Third Exemplary Embodiment

An antenna device with an attachment member of a third exemplary embodiment and an attachment structure for an antenna device thereof differ from the antenna device with the attachment member of the above exemplary embodiments and the attachment structure for the antenna device thereof in the point that the configuration of the attachment member differs therefrom. Note that the same terminology or reference numerals are employed to describe the same or equivalent portions to the content described for the above exemplary embodiments, and description is omitted for configuration and operation and advantageous effects similar to those of the above exemplary embodiment.

Attachment Member

Figure 10:
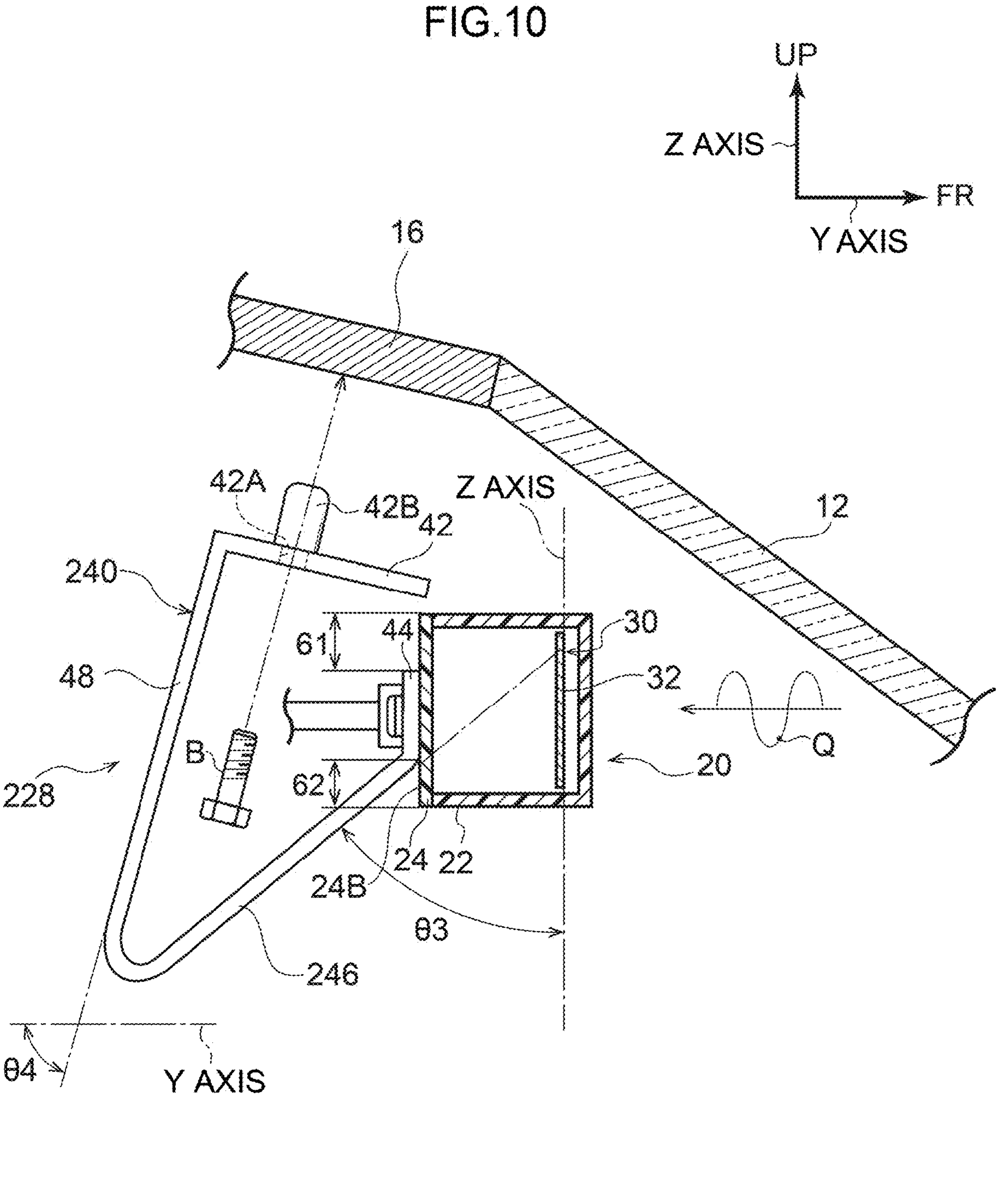
FIG. 10 is an exploded cross-section illustrating an antenna device with an attachment member according to a third exemplary embodiment in a state attached to a windshield, and illustrates a section along A-A of FIG. 1.

FIG. 10 is an exploded cross-section taken along A-A of FIG. 1 and including an antenna device with an attachment member 228. As illustrated in FIG. 10, an attachment member 240 of the antenna device with the attachment member 228 is integrally formed from metal, and is configured including an attachment portion 42, fixing portions 44, an extension portion 246, and a connection portion 48.

The extension portion 246 is formed so as not to contact a back face 24B, and to extend from vehicle up-down direction lower ends of the fixing portions 44 in a direction separating from the radiation plate 32. The extension portion 246 is formed extending from vehicle up-down direction lower ends of the fixing portions 44 in a diagonally downward and rearward direction of the vehicle 10. The extension portion 246 is formed so as not to contact the first region 61 and the second region 62.

An angle θ3 formed between the extension portion 246 and the radiation face 32A can be adjusted in a range of from 20° to 160°. Note that the angle θ3 may also be called the angle formed between the extension portion 246 and the fixing portions 44 when, as in the cross-section illustrated in FIG. 10, the case section 22 is substantially rectangular and the angle θ3 is for cases in which the radiation face 32A and the fixing portions 44 are substantially parallel along the vertical direction. Moreover, in the antenna device with the attachment member 228, in a state in which the attachment member 240 is attached to the metal frame 16, an angle θ4 of a direction of extension of the extension portion 246 with respect to a horizontal plane can be adjusted in a range of from −30° to 70°. Note that θ4 is an angle that has a negative sign when a direction in which the extension portion 246 separates from fixing portions 44B is an angle of dip direction with respect to a horizontal plane, and is an angle that has a positive sign when a direction in which the extension portion 246 separates from the fixing portions 44 is an angle of elevation direction.

Even when such a configuration is adopted, as long as the angle θ3 formed between the extension portion 246 and the fixing portions 44 is in a range of from 20° to 160° in the antenna device with the attachment member 228, the metal extension portion 246 is disposed separated from the first region 61 and the second region 62. This means that changes to the transceiving properties of the vertically polarized waves Q due to the metal extension portion 246 are suppressed in the antenna device with the attachment member 228, a drop in antenna gain can be suppressed, and consequently stable directionality can be secured. Note that θ3 may be in a range of from 90° to 135°, and may be in a range of from 45° to 90°.

Moreover, as long as the extension direction of the extension portion 246 is in a range of from −30° to 70° with respect to a horizontal plane in the antenna device with the attachment member 228, the metal extension portion 246 is disposed separated from the first region 61 and the second region 62. This means that changes to the transceiving properties of the vertically polarized waves Q due to the metal extension portion 246 are suppressed in the antenna device with the attachment member 228, a drop in antenna gain can be suppressed, and consequently stable directionality can be secured. Note that θ4 may be in a range of from 0° to 45°, and may be in a range of from −30° to 0°.

Fourth Exemplary Embodiment

An antenna device with an attachment member of a fourth exemplary embodiment and an attachment structure for an antenna device thereof differ from the antenna device with the attachment member of the above exemplary embodiments and the attachment structure for the antenna device thereof in the point that the configuration of the antenna differs therefrom.

Antenna Device With Attachment Member Configuration

Description follows regarding a configuration of an antenna device with an attachment member of the fourth exemplary embodiment and an attachment structure for an antenna device thereof. Note that the same terminology or reference numerals are employed to describe the same or equivalent portions to the content described for the above exemplary embodiments, and description is omitted for configuration and operation and advantageous effects similar to those of the above exemplary embodiment.

Figure 11:
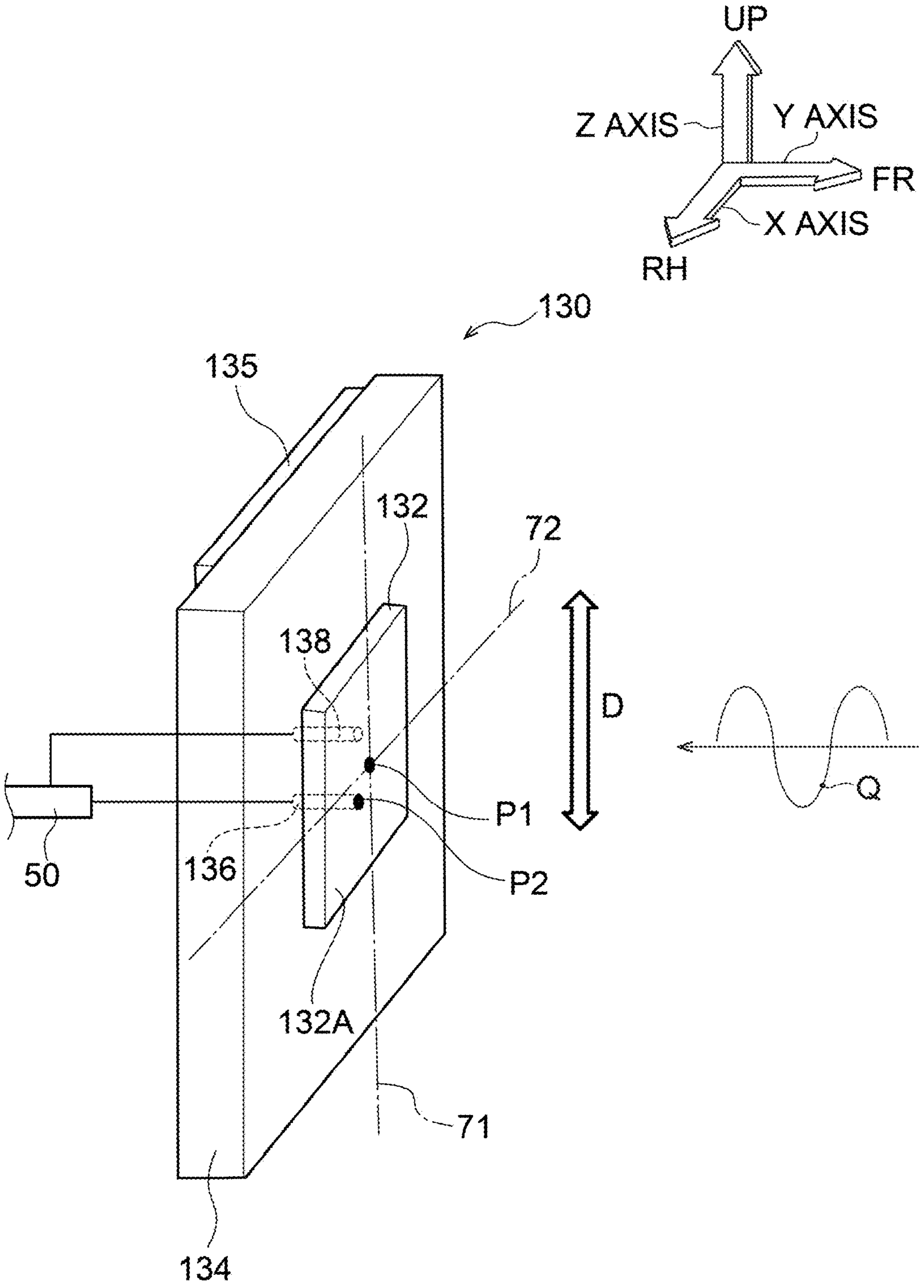
FIG. 11 is a perspective view illustrating an antenna according to a fourth exemplary embodiment, viewed diagonally from in front.

FIG. 11 is a perspective view of an antenna 130. As illustrated in FIG. 11, the antenna 130 is a patch antenna (microstrip antenna) configured including a radiation plate (radiation conductor) 132, a dielectric substrate 134, a ground conductor plate 135, and a connection conductor 136.

The dielectric substrate 134 is a dielectric layer having a dielectric substance as a main component thereof. The radiation plate 132 is provided to a surface (a first main face) of the dielectric substrate 134. The radiation plate 132 functions as a radiation element of the antenna 130. The ground conductor plate 135 is provided on a back face (a second main face) of the dielectric substrate 134. The ground conductor plate 135 is connected to a grounding covering wire of the coaxial cable 50.

The connection conductor 136 connects a feed point P2 of the radiation plate 132 and a signal line (core line) of the coaxial cable 50 together. Note that the connection conductor 136 does not contact the ground conductor plate 135.

A surface at a vehicle front-rear direction front side of the radiation plate 132 configures a radiation face 132A. The radiation face 132A radiates vertically polarized waves Q in a 5.8 GHz band or a 5.9 GHz band employed for vehicle-to-vehicle communication, roadside-to-vehicle communication, and the like. In the antenna 130, the ground conductor plate 135 is provided on the opposite side with respect to the radiation plate 132 from the side disposed with the radiation face 132A, with the dielectric substrate 134 interposed therebetween.

Figure 12:
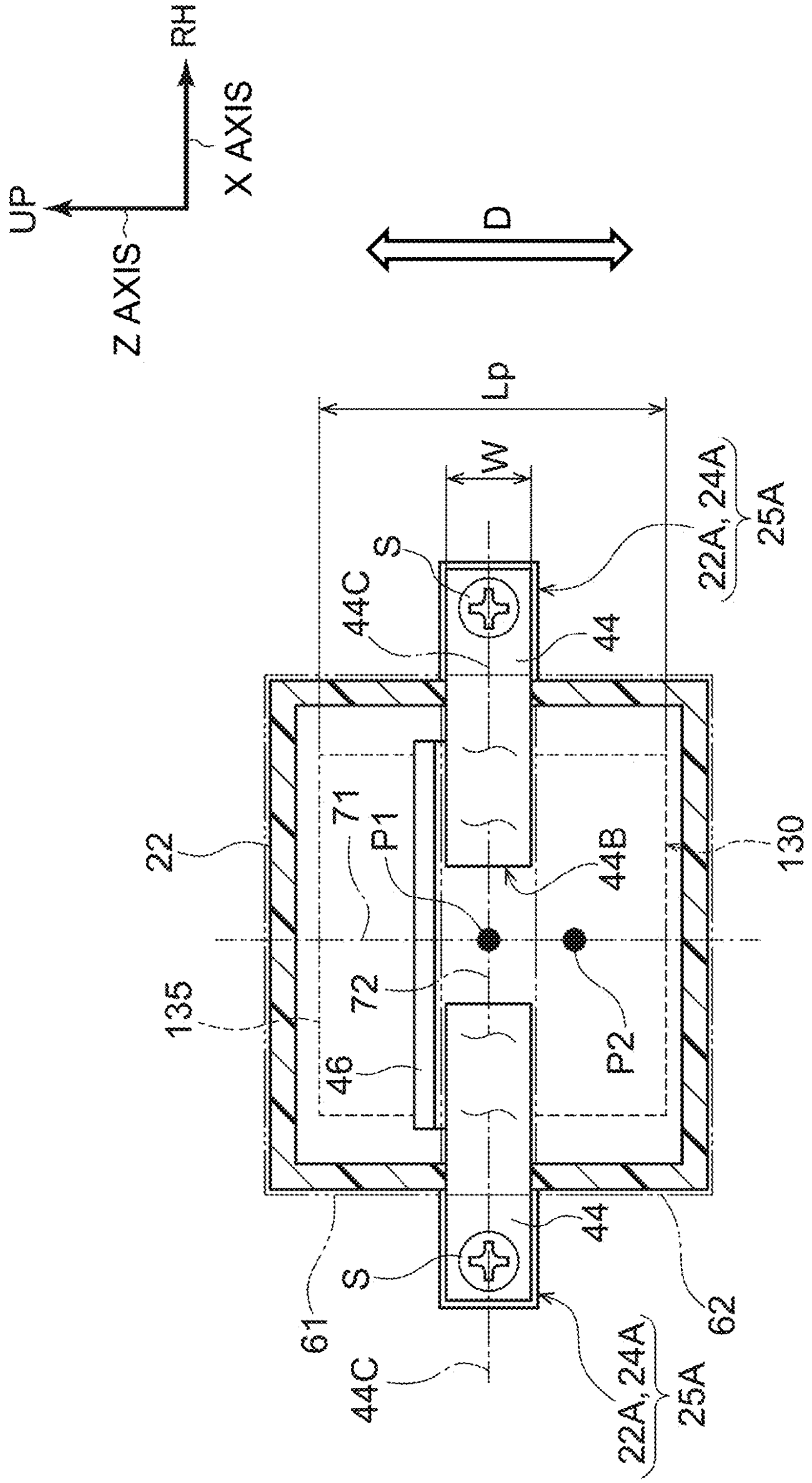
FIG. 12 is a plan view illustrating an antenna device with an attachment member according to the fourth exemplary embodiment, viewed along a plate thickness direction of a radiation plate.

As illustrated in FIG. 12, viewed from the thickness direction of the radiation plate 132, the feed point P2 of the antenna 130 is disposed on the first straight line 71 at a position different to the centroid P1 of the radiation plate 132.

A width W of the fixing portions 44 in the extension direction of the first straight line 71 is formed so as to be narrower than a width $L_P$ of the ground conductor plate 135 in the extension direction of the first straight line 71.

FIG. 12 is a plan view illustrating an antenna device with the attachment member viewed from the thickness direction of the radiation plate 132 from the opposite side to the radiation face 132A side. As illustrated in FIG. 12, in the antenna device with the attachment member of the fourth exemplary embodiment, the fixing portions 44 are disposed such that a length direction axial line 44C of the fixing portions 44 overlaps with the second straight line 72. This means that the first region 61 and the second region 62 where the metal fixing portions 44 are not disposed are substantially the same size in the extension direction of the first straight line 71. Furthermore, a region where the first region 61 overlaps with the ground conductor plate 135 that is a conductor of the antenna 30, and a region where the second region 62 overlaps with the ground conductor plate 135 that is a conductor of the antenna 30, have substantially the same shape and substantially the same surface area as each other. This means that changes to the transceiving properties of the vertically polarized waves Q due to the metal fixing portions 44 are further suppressed in the antenna device with the attachment member of the fourth exemplary embodiment, enabling a drop in antenna gain to be further suppressed, and consequently enabling a desired antenna directionality to be secured.

The width W of the fixing portions 44 in the extension direction of the first straight line 71 and the width $L_P$ of the ground conductor plate 135 in the extension direction of the first straight line 71 may satisfy the following Equation (2a), preferably satisfy the Equation (2b), and more preferably satisfy the Equation (2c). When $W/L_P$ is less than 0.01 a concern arises that the fixing strength between the fixing portions 44 and the housing portion 20 might be weak and unstable. Moreover, when the $W/L_P$ exceeds 0.75 a concern arises that there would be a drop in the antenna gain of the antenna 130.

$$0.01 \leq W/L_P \leq 0.75 \quad \text{Equation (2a)}$$

$$0.05 \leq W/L_P \leq 0.65 \quad \text{Equation (2b)}$$

$$0.10 \leq W/L_P \leq 0.50 \quad \text{Equation (2c)}$$

Note that the antenna 130 may be further provided with a non-illustrated parasitic conductor plate. The parasitic conductor plate is a conductor not connected to a feed line and a ground line or the like (conductor at a ground potential) of a transmission line. The parasitic conductor plate may, for example, be disposed so as not to overlap with the radiation plate 132 on a main face of the dielectric substrate 134 on the side on which the radiation plate 132 is disposed. Moreover, there may be one parasitic conductor plate provided, and there may be two provided thereof. In cases in which there are two parasitic conductor plates provided, the parasitic conductor plates may be disposed one each on both sides of a first straight line 71 at the center, in a shape having line symmetry with respect to the first straight line 71. In particular, when the parasitic conductor plate has a quadrangular shaped (for example, a rectangular shaped) outer edge so as to extend in the vibration direction D of the vertically polarized waves Q, the antenna 130 readily obtains good directionality in an angle range (180° angle range) of a horizontal plane across from the LH to FR to RH directions (see FIG. 8).

Fourth Exemplary Embodiment Operation

Next, description follows regarding operation and advantageous effects of an antenna device with an attachment member of the fourth exemplary embodiment and an attachment structure for an antenna device thereof.

Due to setting a width W of the fixing portions 44 in the extension direction of the first straight line 71 so as to satisfy Equation (2a), an antenna device with an attachment member of the fourth exemplary embodiment is strongly attached to the vehicle body is with high rigidity, and a drop in antenna gain can be suppressed, and consequently stable directionality can be secured.

The antenna device with the attachment member and antenna device have been described above based on the above exemplary embodiments. However, the specific configuration thereof is not limited to these exemplary embodiments, and design changes and the like are permitted that do not depart from the spirit of the invention according to each claim of the scope of patent claims.

Figure 13:
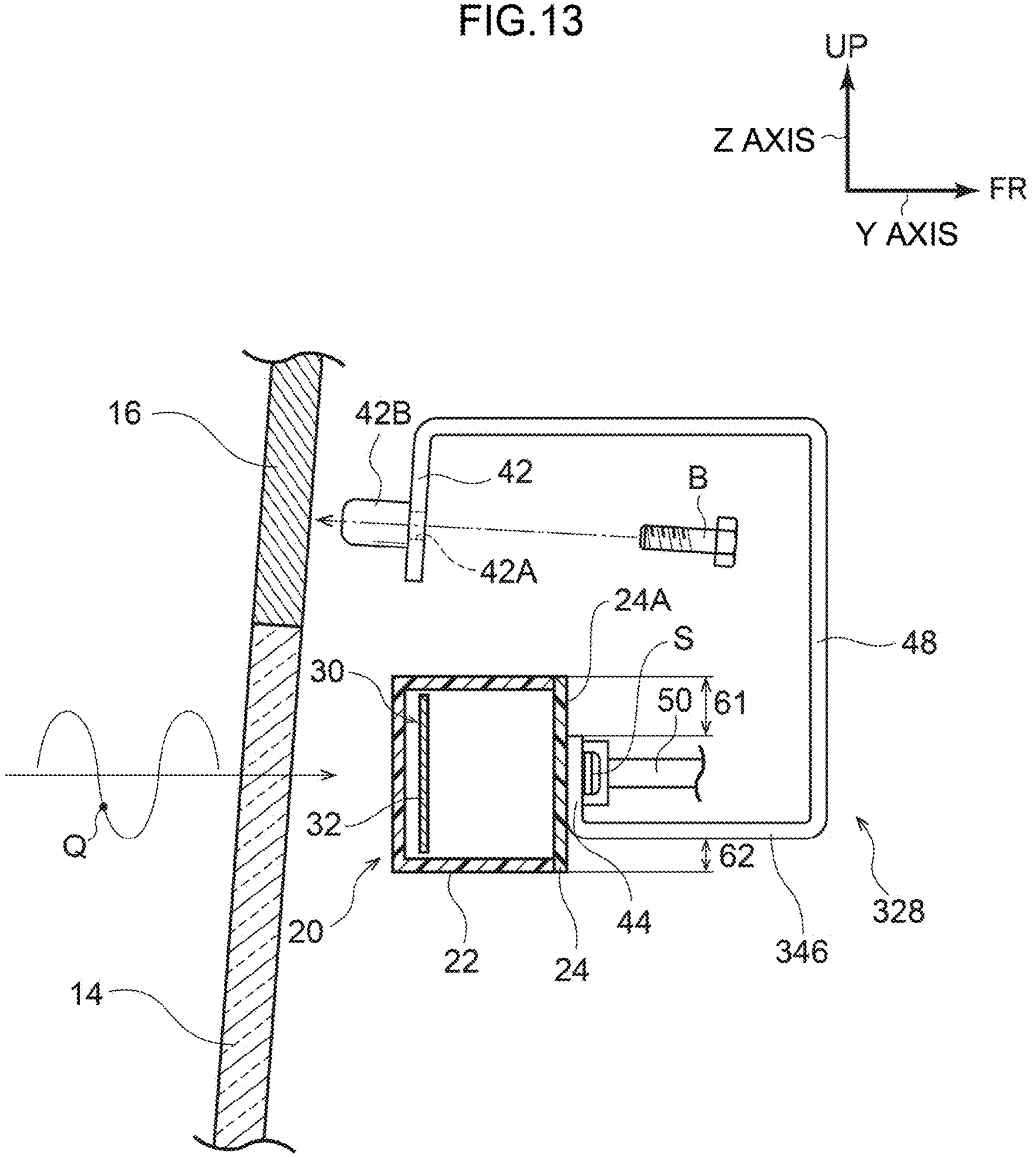
FIG. 13 is an exploded cross-section illustrating an antenna device with an attachment member according to a separate exemplary embodiment in a state attached to a rear glass, and illustrates a section along B-B of FIG. 1.

In the above exemplary embodiments, antenna devices with the attachment member have been described for examples attached in the vicinity of a vehicle cabin inside of the windshield 12 of the vehicle 10. FIG. 13 is an exploded cross-section taken along B-B of FIG. 1 and including an antenna device with the attachment member 328. As illustrated in FIG. 13, the antenna device with the attachment member 328 may be attached in the vicinity of a vehicle cabin inside of the rear glass 14. In such cases an extension portion 346 may, for example, be formed extending from vehicle up-down direction (vertical direction) lower ends of the fixing portions 44 in a vehicle forward direction (the vehicle cabin inside). Moreover, the connection portion 48 may be formed in a substantially L-shape in a cross-section along the YZ plane. Note that an antenna device with the attachment member 328 may be attached in the vicinity of an upper portion of the windshield 12.

In the above exemplary embodiments, antenna device with the attachment member antenna devices with the attachment member have been described for examples in which there is one thereof attached in the vicinity of the windshield 12 of the vehicle 10. However, there may be one or more antenna device with the attachment member, with one or more thereof respectively attached in the vicinity of the windshield 12 and the vicinity of the rear glass 14 of the vehicle 10, and they may be attached at other places.

In the above exemplary embodiments, examples have been illustrated in which the housing portion 20 includes the protruding portions 25A. However, a housing portion may omit protruding portions. In such cases, an attachment portion for attaching the fixing portions 44 to the housing portion 20 may be provided further inside than an outer edge of the back face 24B of the housing portion 20.

In the above exemplary embodiments examples have been illustrated in which the housing portion 20 houses the entire antenna 30. However, the housing portion may house at least one portion of the antenna.

In the above exemplary embodiments examples have been illustrated in which the attachment member 40 is formed in a substantially U-shape by the attachment portion 42, the extension portion 46, and the connection portion 48 in cross-section along the YZ plane. However, the attachment member may be formed in a crank shape in cross-section along the YZ plane by an attachment portion, an extension portion, and a connection portion, and may be formed in another shape.

In the above exemplary embodiment the antennas 30, 130 are illustrated for examples of antenna that transceive vertically polarized waves Q of a 5.8 GHz band or a 5.9 GHz band employed for vehicle-to-vehicle communication, road-side-to-vehicle communication, and the like. However, the antenna may be an antenna that transceives vertically polarized waves in another frequency band. Moreover, the antenna may be an antenna that transceives horizontally polarized waves (an example of linearly polarized waves).

In the above exemplary embodiment the attachment member 40 illustrated is for an example integrally formed from metal. However, in the attachment member it is sufficient if at least the fixing portions 44 are formed from metal. Moreover, part of the attachment member may be formed by a separate body.

In the above exemplary embodiments, examples are illustrated in which there are two attachment holes 25B provided as attachment portions to attach the fixing portions 44 to the housing portion 20. However, there may be one or three or more attachment portions provided for attaching the fixing portions 44 to the housing portion 20.

In the above exemplary embodiments, examples are illustrated in which the antennas 30, 130 are V2X antennas. However, the antennas may be applied to various antennas, such as antennas for receiving broadcast radio waves, and antennas used in ITS, and antennas of a 1.2 GHz band.

The entire content of the disclosure of Japanese Patent Application No. 2021-202862 filed on Dec. 14, 2021 is incorporated by reference in the present specification.

What is claimed is:

1. An antenna device with an attachment member comprising:

an antenna including a radiation plate provided with a radiation face that radiates linearly polarized waves of a prescribed frequency band;

a housing portion that houses at least a portion of the antenna;

an attachment member that attaches the housing portion to a vehicle; and metal fixing portions that are formed in an elongated shape to one end of the attachment member, that abuts a back face of the housing portion on an opposite side of the radiation plate to the radiation face side, and that fixes the housing portion, wherein when a first straight line defined as passing through a centroid of the radiation plate in a vibration direction of the linearly polarized waves when viewed from a thickness direction of the radiation plate, and a second straight line defined as being orthogonal to the first straight line and passing through the centroid, and with each of the fixing portions disposed with its length direction along an extension direction of the second straight line, then viewed from the thickness direction of the radiation plate, each of the fixing portions is disposed between a first region formed to the back face on one side in the extension direction of the first straight line, and a second region formed to the back face on another side in the extension direction of the first straight line.

2. The antenna device with the attachment member of claim 1, wherein viewed from the thickness direction of the radiation plate, the fixing portion is disposed such that a length direction axial line of the fixing portion overlaps with the second straight line.

3. The antenna device with the attachment member of claim 1, wherein viewed from the thickness direction of the radiation plate, a feed point of the antenna is disposed on the first straight line at a different position to the centroid.

4. The antenna device with the attachment member of claim 1, wherein the antenna includes a ground conductor plate on an opposite side with respect to the radiation plate to the side where the radiation face is disposed, with a dielectric substrate interposed between the ground conductor plate and the radiation plate.

5. The antenna device with the attachment member of claim 4, wherein a width W of each of the fixing portions in the extension direction of the first straight line is set so as to satisfy a relationship equation with respect to a length $L_P$ of the ground conductor plate in the extension direction of the first straight line:

$$0.01 \leq W/L_S \leq 0.75.$$

6. The antenna device with the attachment member of claim 4, wherein a region of overlap between the first region and the ground conductor plate and a region of overlap between the second region and the ground conductor plate have substantially the same shape and substantially the same surface area as each other.

7. The antenna device with the attachment member of claim 1, wherein the antenna is a slot antenna including a slot extending along the second straight line.

8. The antenna device with the attachment member of claim 7, wherein a width W of each of the fixing portions in the extension direction of the first straight line is set so as to satisfy a relationship equation with respect to a length $L_S$ of the radiation plate in the extension direction of the first straight line:

$$0.01 \leq W/L_P \leq 0.75.$$

9. The antenna device with the attachment member of claim 7, wherein a region of overlap between the first region and the radiation plate and a region of overlap between the second region and the radiation plate have substantially the same shape and substantially the same surface area as each other.

10. The antenna device with the attachment member of claim 1, wherein:

the housing portion includes a protruding portion that protrudes along the second straight line viewed from the thickness direction of the radiation plate; and an attachment portion is formed to the protruding portion for attaching the fixing portions to the housing portion through a metal fastening member.

11. The antenna device with the attachment member of claim 1, wherein viewed from the thickness direction of the radiation plate the fixing portion has line symmetry with respect to the second straight line.

12. The antenna device with the attachment member of claim 1, wherein:

each of the fixing portions includes an opening portion open in a plate thickness direction at a vicinity of the centroid; and a connecter for electrically connecting to a feed point of the antenna is inserted into the opening portion.

13. The antenna device with the attachment member of claim 1, wherein the attachment member is formed from metal.

14. The antenna device with the attachment member of claim 1, wherein the attachment member is integrally formed.

15. The antenna device with the attachment member of claim 1, wherein the attachment member includes a metal extension portion that extends in a direction separating from the radiation plate.

16. The antenna device with the attachment member of claim 15, wherein an angle formed between the extension portion and the radiation face is in a range of from 20° to 160°.

17. An attachment structure for an antenna device wherein:

in a state in which the attachment member of claim 15 is attached to the vehicle; and an extension direction that the extension portion extends in is in a range of from −30° to 70° with respect to a horizontal plane.

18. An attachment structure for an antenna device, wherein:

the radiation face of an antenna of claim 1 is provided so as to be within ±15° with respect to a vertical direction in a state in which the attachment member is attached to the vehicle.

19. The attachment structure for the antenna device of claim 17, wherein:

the first straight line is disposed so as to be in a range of ±15° with respect to an up-down direction of the vehicle; and the prescribed frequency band includes a 5.8 GHz band or a 5.9 GHz band.

20. The attachment structure for the antenna device of claim 19, wherein the antenna is a V2X antenna.

* * * * *